US008095444B2

(12) United States Patent
Van Erlach et al.

(10) Patent No.: US 8,095,444 B2
(45) Date of Patent: Jan. 10, 2012

(54) DETERMINATION OF GOLD PRICE AND BOND YIELD ACCORDING TO THE REQUIRED YIELD METHOD

(76) Inventors: Julian Van Erlach, Fort Worth, TX (US); Christophe Faugere, Gansevoort, NY (US)

( * ) Notice: Subject to any disclaimer, the term of this patent is extended or adjusted under 35 U.S.C. 154(b) by 67 days.

(21) Appl. No.: 12/766,956

(22) Filed: Apr. 26, 2010

(65) Prior Publication Data

US 2010/0205117 A1    Aug. 12, 2010

Related U.S. Application Data

(62) Division of application No. 10/960,604, filed on Oct. 7, 2004, now Pat. No. 7,725,374.

(60) Provisional application No. 60/509,824, filed on Oct. 10, 2003.

(51) Int. Cl.
*G06Q 40/00*    (2006.01)
(52) U.S. Cl. ........................................ 705/35; 705/36 R
(58) Field of Classification Search .................... 705/35, 705/36 R
See application file for complete search history.

(56) References Cited

U.S. PATENT DOCUMENTS 5,761,441 A    6/1998    Bennett
5,774,880 A    6/1998    Ginsberg

OTHER PUBLICATIONS

Shiller, Robert J.; Do Stock Prices Move Too Much to be Justified by Subsequent Changes in Dividends?; The American Economic Review, vol. 71, No. 3 (Jun. 1981), pp. 421-436.
Pritchett, Lant; Divergence, Big Time; The Journal of Economic Perspectives, vol. 11, Issue 3 (Summer, 1997); pp. 3-17.
Miller et al.; Dividend Policy, Growth, and the Valuation of Shares; The Journal of Business, vol. XXXIV, Oct. 1961, No. 4, pp. 411-433.
Fama et al.; Forecasting Profitability and Earnings; The Journal of Business vol. 73, Issue 2 (Apr. 2000), pp. 161-175.
Lander, Joel; Earnings Forecasts and the Predictability of Stock Returns: Evidence From Trading the S&P; Jan. 1997; 24 pages.
Heath et al.; Bond Pricing and the Term Structure of Interest Rates: A Discrete Time Approximation; The Journal of Financial and Quantitative Analysis, vol. 25, No. 4 (Dec. 1990), pp. 419-440.
Feldstein, Martin; Inflation, Income Taxes and the Rate of Interest: A Theoretical Analysis; The American Economic Review, vol. 66, No. 5 (Dec. 1976), pp. 809-820.
Lee et al.; What is the Intrinsic Value of the Dow?; The Journal of Finance, vol. 54, No. 5 (Oct. 1999), pp. 1693-1741.
Reilly, Frank K.; Investment Analysis and Portfolio Management, Third Edition; Dryden Press, 1989, pp. 306-334.

(Continued)

*Primary Examiner* — Jagdish Patel
*Assistant Examiner* — Sara Chandler
(74) *Attorney, Agent, or Firm* — Schmeiser, Olsen & Watts, LLP

(57) ABSTRACT

A method, computer system, and computer program product for performing an asset analysis for at least one asset, using the Required Yield Method (RYM). The method provides first economic data relating to a first economy. The economic data includes a gross domestic product (GDP) per capita growth rate for the first economy. The economic data may further include an expected inflation rate for the first economy over a time interval. At least one asset characteristic (e.g. asset valuation) of each asset of the least one asset is computed. The at least one asset characteristic is a function of a portion of the economic data. The computing is in accordance with the RYM. The computed at least one asset characteristic is transferred to a tangible medium. The at least one asset may include an equity index, a bond, gold, a currency, a derivative, etc.

60 Claims, 12 Drawing Sheets

Benchmark Comparison of RYM and FED Valuation Formulas

Tracking percentage error is computed for the RYM under two alternative long term real GDP/capita growth rates (in parentheses).

| Frequency | Period | Mean % Error Compared to S&P 500 Index | | |
|---|---|---|---|---|
| | | RYM (2.07%) | RYM (1.5%) | FED Model |
| Monthly | 1954-2002 | 21.4% | 22.0% | 32.9% |
| | 1970-2002 | 16.1% | 14.4% | 15.1% |
| | 1979-2002 | 9.9% | 9.6% | 12.2% |
| | 1990-2002 | 11.0% | 11.3% | 12.5% |
| Quarterly | 1954-2002 | 17.5% | 17.3% | 36.8% |
| | 1970-2002 | 12.9% | 10.9% | 20.2% |
| | 1979-2002 | 10.9% | 10.1% | 12.4% |
| | 1990-2002 | 13.1% | 12.6% | 12.4% |

OTHER PUBLICATIONS

Mehra, Rajnish; The Equity Premium: Why Is It a Puzzle?; 2003, AIMR; pp. 54-69.

Sharpe, Steven A.; Stock Prices, Expected Returns, and Inflation; Aug. 1999 (Original draft, Jan. 1999); 46 pages.

Faugere, Christophe and Van Erlach, Julian; Stocks vs. Bonds in the Long Run: A Premium for Growth; Jan. 2003; 19 pages.

Faugere, Christophe and Van Erlach, Julian; The Equity Premium: Explained by GDP Growth and Consistent with Portfolio Insurance; Jun. 2003; 28 pages.

Black et al.; US Stock Prices and Macroeconomic Fundamentals; International Review of Economics and Finance 12. North-Holland. Oct. 28, 2002; pp. 345-367.

Canova et al.; Stock Returns and Real Activity: A Structural Approach; European Economic Review 39 (Feb. 1995); pp. 981-1015.

Ibbotson et al; The Supply of Stock Market Returns; Yale Center for Finance, Yale School of Management; Jun. 2001.

Bosomworth et al.; New Economy, The Equity Premium and Stock Valuation; European Central Bank; Jun. 22, 2001; 26 pages.

Yardeni, Edward; Stock Valuation Models (4.1): Topical Study #58; Prudential Financial Research. Jan. 6, 2003; 31 pages.

Welch, Ivo; A Note of the Equity Size Puzzle; Anderson Graduate School of Management at UCLA; Nov. 23, 1999; p. 7.

Jorion et al.; A Century of Global Stock Markets; Working Paper 7565; NBER Working Paper Series. National Bureau of Economic Research; Feb. 2000; 32 pages.

Van Erlach, Julian; A History Lesson for Stocks and Bonds; [USA edition]; Financial Times. London (UK); Nov. 19, 2002; p. 24. [on line] 3 pages. [retrieved on Oct. 31, 2008]. Retrieved from the Internet: < URL: http://proquest.umi.com/pqdweb?index=5&did=239809341&SrchMode=2&sid=1&fmt=...>.

Davis et al.; Demographics and Financial Asset Prices in the Major Industrial Economies; Brunel University, West London; Mar. 19, 2003; 37 pages.

U.S. Appl. No. 12/542,075, filed Aug. 17, 2009.

Notice of Allowance (Mail Date: Jan. 12, 2010) for U.S. Appl. No. 10/960,604, filed Oct. 7, 2004.

Benchmark Comparison of RYM and FED Valuation Formulas

Tracking percentage error is computed for the RYM under two alternative long term real GDP/capita growth rates (in parentheses).

| Frequency | Period | Mean % Error Compared to S&P 500 Index | | |
|---|---|---|---|---|
| | | RYM (2.07%) | RYM (1.5%) | FED Model |
| Monthly | 1954-2002 | 21.4% | 22.0% | 32.9% |
| | 1970-2002 | 16.1% | 14.4% | 15.1% |
| | 1979-2002 | 9.9% | 9.6% | 12.2% |
| | 1990-2002 | 11.0% | 11.3% | 12.5% |
| Quarterly | 1954-2002 | 17.5% | 17.3% | 36.8% |
| | 1970-2002 | 12.9% | 10.9% | 20.2% |
| | 1979-2002 | 10.9% | 10.1% | 12.4% |
| | 1990-2002 | 13.1% | 12.6% | 12.4% |

*FIG. 1*

Predictability of S&P 500 Price Movements Based on RYM and FED Models

OLS regressions: $P_{t+j} - P_t = \alpha + \beta \times (FairP_t - P_t)$ are run using monthly observations.

T-statistics are shown in parentheses.

| Lead | Period 1: 1954-1970 | | | | Lead | Period 2: 1970-1997 | | | |
|---|---|---|---|---|---|---|---|---|---|
| | Adjusted R 2 | | Slope $\beta$ | | | Adjusted R 2 | | Slope $\beta$ | |
| | RYM | FED | RYM | FED | | RYM | FED | RYM | FED |
| j=1 | 2.04% | 1.88% | 0.01 (2.23) | 0.01 (2.16) | j=1 | 6.81% | 4.06% | 0.08 (4.96) | 0.05 (3.83) |
| j=2 | 3.92% | 3.90% | 0.03 (2.96) | 0.03 (2.96) | j=2 | 10.76% | 5.26% | 0.17 (6.32) | 0.10 (4.35) |
| j=3 | 5.30% | 5.74% | 0.04 (3.42) | 0.04 (3.44) | j=3 | 13.80% | 6.08% | 0.25 (7.26) | 0.14 (4.68) |
| j=4 | 6.54% | 7.58% | 0.05 (3.79) | 0.05 (4.08) | j=4 | 15.93% | 6.38% | 0.33 (7.89) | 0.17 (4.80) |
| j=5 | 8.58% | 9.89% | 0.06 (4.35) | 0.07 (4.69) | j=5 | 15.65% | 5.35% | 0.38 (7.81) | 0.18 (4.39) |
| j=6 | 10.10% | 11.60% | 0.08 (4.74) | 0.08 (5.11) | j=6 | 15.01% | 4.22% | 0.42 (7.62) | 0.19 (3.90) |
| j=7 | 11.51% | 13.08% | 0.09 (5.08) | 0.10 (5.45) | j=7 | 13.89% | 3.09% | 0.46 (7.29) | 0.19 (3.36) |
| | | | | | | Total Period: 1954-1997 | | | |
| j=8 | 12.98% | 14.50% | 0.11 (5.43) | 0.11 (5.78) | j=1 | 2.94% | 1.90% | 0.04 (4.07) | 0.03 (3.31) |
| j=9 | 14.04% | 15.56% | 0.12 (5.67) | 0.12 (6.02) | j=2 | 4.62% | 2.38% | 0.09 (4.09) | 0.06 (3.68) |
| j=10 | 15.12% | 16.24% | 0.13 (5.92) | 0.13 (6.17) | j=3 | 5.81% | 2.66% | 0.13 (5.72) | 0.08 (3.88) |
| j=11 | 16.15% | 16.66% | 0.14 (6.15) | 0.14 (6.26) | j=4 | 6.58% | 2.69% | 0.17 (6.11) | 0.10 (3.90) |
| j=12 | 16.36% | 16.69% | 0.14 (6.14) | 0.14 (6.26) | j=5 | 6.23% | 2.05% | 0.19 (5.93) | 0.10 (3.43) |
| j=13 | 16.60% | 16.54% | 0.15 (6.25) | 0.15 (6.23) | j=6 | 5.72% | 1.41% | 0.21 (5.68) | 0.10 (2.89) |
| j=14 | 17.05% | 16.20% | 0.15 (6.34) | 0.15 (6.16) | j=7 | 5.06% | 0.84% | 0.22 (5.33) | 0.09 (2.31) |

*FIG. 2*

DETERMINATION OF GOLD PRICE AND BOND YIELD ACCORDING TO THE REQUIRED YIELD METHOD

This application is a divisional application claiming priority to Ser. No. 10/960,604, filed Oct. 7, 2004; which claims priority to U.S. Provisional Application No. 60/509,824, filed Oct. 10, 2003.

BACKGROUND OF THE INVENTION

1. Technical Field

The present invention relates to a method, computer system, and computer program product for asset analysis, including securities and asset valuation and applications thereof, and further including investment portfolio analysis and asset management.

2. Related Art

Current methods and systems lack an understanding of the mechanics underlying the behavior of assets such as equity indexes, bonds, etc., which limits the ability of current methods and systems to analyze characteristics of such assets. Accordingly, there is a need for a methodology for analyzing assets that is grounded in economic theory that underlies the behavior of assets and exhibits a high degree of explanatory power as compared to what exists in the related art.

SUMMARY OF THE INVENTION

The present invention provides a method for performing an asset analysis according to the Required Yield Method (RYM), said method comprising:

providing economic data relating to a first economy, said economic data comprising a gross domestic product (GDP) per capita growth rate $(g_{y1})$ for the first economy;

computing at least one asset characteristic of each asset of at least one asset, said at least one asset characteristic being a function of a portion of the economic data, said computing being in accordance with the RYM; and transferring said computed at least one asset characteristic to a tangible medium.

The present invention provides a computer program product, comprising a computer usable medium having a computer readable program code embodied therein, said computer readable program code comprising an algorithm adapted to implement a method for performing an asset analysis according to the Required Yield Method (RYM), said method comprising:

providing economic data relating to a first economy, said economic data comprising a gross domestic product (GDP) per capita growth rate $(g_{y1})$ for the first economy;

computing at least one asset characteristic of each asset of at least one asset, said at least one asset characteristic being a function of a portion of the economic data, said computing being in accordance with the RYM; and transferring said computed at least one asset characteristic to a tangible medium.

The present invention provides a computer system comprising a processor and a computer readable memory unit coupled to the processor, said memory unit containing instructions that when executed by the processor implement a method for performing an asset analysis according to the Required Yield Method (RYM), said computer system further comprising a RYM engine, said method comprising the computer implemented steps of:

providing economic data to the RYM engine, said economic data relating to a first economy, said economic data comprising a gross domestic product (GDP) per capita growth rate $(g_{y1})$ for the first economy;

computing, by the RYM engine, at least one asset characteristic of each asset of at least one asset, said at least one asset characteristic being a function of a portion of the economic data, said computing being in accordance with the RYM; and transferring, from the RYM engine, said computed at least one asset characteristic to a tangible medium.

The present invention advantageously provides a methodology for analyzing assets that is grounded in economic theory that underlies the behavior of assets and exhibits a high degree of explanatory power compared to what exists in the related art.

BRIEF DESCRIPTION OF THE DRAWINGS

FIG. 1 is a table in which the performance of the Required Yield Method (RYM) of the present invention is compared with the performance of the Fed Model for valuing the Standard and Poors (S&P) 500 index.

FIG. 2 is a table showing predicted vs. actual stock market price movements for the RYM and the Fed Model, in accordance with embodiments of the present invention.

DETAILED DESCRIPTION OF THE INVENTION

Figure 3:
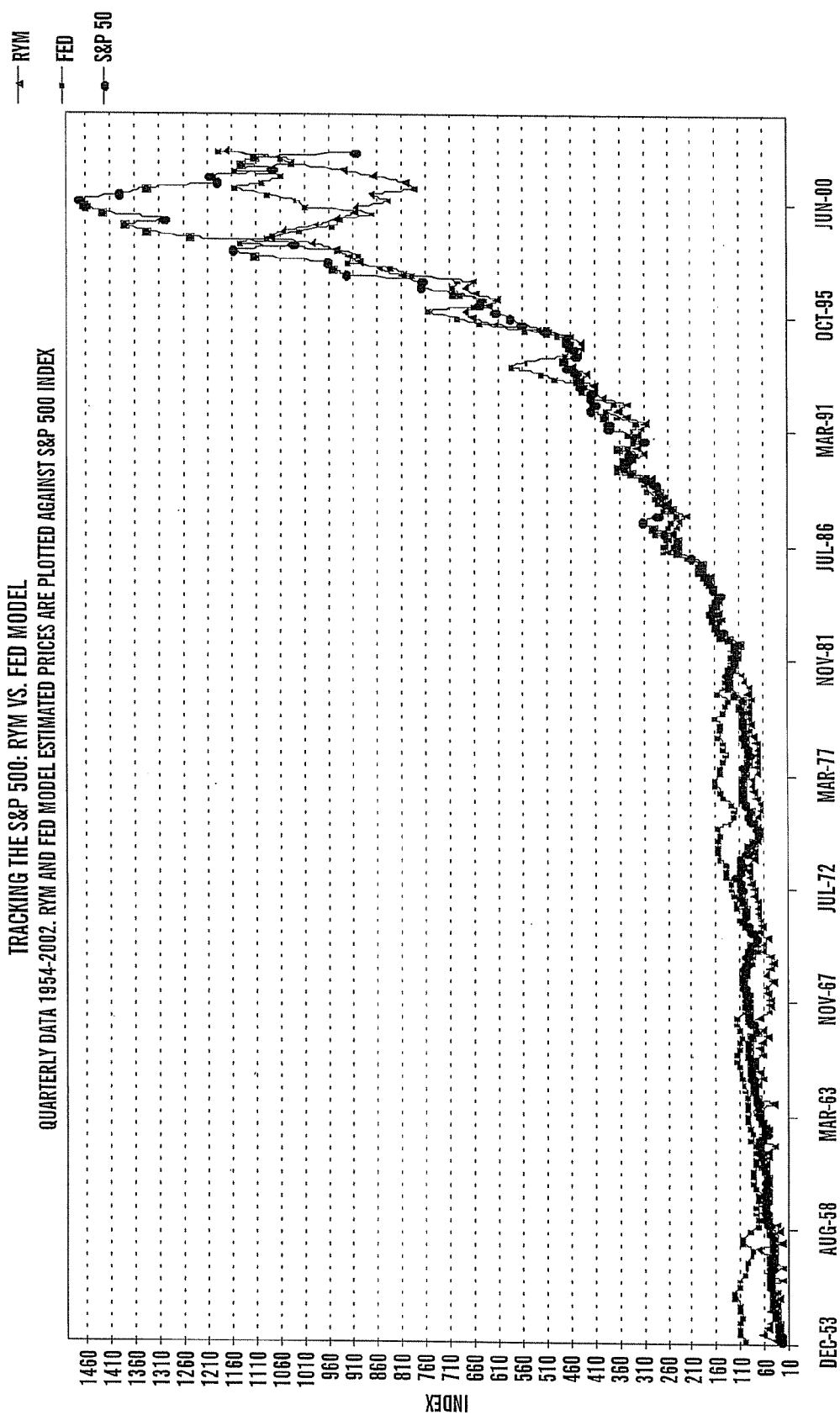
FIG. 3 and FIG. 4 respectively graphically illustrate the tracking of the S&P 500 index and Price/Earnings (P/E) ratios using the RYM valuation formula vs. the Fed Model over the period 1954-2002 respectively using quarterly and monthly data, in accordance with embodiments of the present invention.

The present invention discloses the Required Yield Method (RYM) which, inter alia, ties both asset valuation and long-term returns directly to Gross Domestic Product (GDP) growth in a unique way that differs from the standard asset pricing economic and financial models, by showing that assets are priced to yield a minimum nominal expected return that results in a real, after-tax return equal to the long-term, global or domestic real per-capita productivity growth rate.

The present invention provides a method and an associated system and computer program product for performing asset analysis according to the RYM. The method provides utilization of economic data relating to one or more economies; computing characteristics of assets (each asset characteristic being a function of a portion of the economic data, the computing being in accordance with the RYM); and transferring the computed characteristics to a tangible medium (e.g., an information viewing medium such as a computer screen, a printer, a data storage unit such as Random Access Memory (RAM), hard disk, optical storage, etc.) for such uses as visual display, hard copy, input to financial analysis software (e.g., the application engine 20 of FIG. 8 discussed infra).

The present Detailed Description of the Invention describes embodiments and applications of the present invention and comprises the following sections: 1) Required Yield Method and Equity Evaluation; 2) Gold and Foreign Exchange (RY Parity) Valuation; 3) Required Yield Method and Fixed Income (Bond) Yield; 4) Additional Embodiments and Applications; 5) Computer System; and 6) Symbols and Mathematical Notation.

1. Required Yield Method and Equity Evaluation

The Required Yield Method (RYM) provides an integrated theoretical framework that derives the stock market return from macroeconomic growth. The RYM shows that the key to valuing the stock market resides in resolving the apparent mathematical paradox of equity returns that compound in excess of GDP growth. The Required Yield Method leads to a formula that describes and predicts the fair value of a broad stock index (e.g., S&P 500) given historic and concurrent macroeconomic and financial variables and expectations and historically tracks the index more accurately than does the "Fed Model", while providing a theoretical as well as empirical foundation. For a description of the "Fed Model", see Lander, Joe; Athanasios Orphanides and Martha Douvogiannis, "Earnings Forecasts and the Predictability of Stock Returns: Evidence From Trading the S & P" (Federal Reserve Board Working Paper) (January 1997). The RYM shows infra that the Stock Market Aggregate Return is determined by GDP Growth. Consider an infinitely lived investor owning one share of stock representing ownership of an entire economy (present and future). The return on all possible investments and reinvestments (ignoring foreign investments) must be realized within the bounds of the economy. The economy may be an economy of any country in the world, a global economy, an economy of an economic unit that comprises a plurality of counties (e.g., the European Union (EU)), etc. Thus, countries having an economy that is relevant for the present invention (i.e., essentially any country in the world) include, inter alia, the United States, Canada, Mexico, Russia, the United Kingdom, France, Germany, Japan, other G7 countries and OECD partners, trading partners of these countries, etc.

All dividends reflect a combination of first time dividends as well as dividends received on past dividend reinvestment plans or stock dividends. Total market value includes all reinvested stock dividends. Let time be defined as a sequence of integers and subscripts denote time indices. For example, time $Z_t$ stands for the variable Z at time t. Formally, a cumulative compounded return $CR_{t+1}$ may be written as:

$$1 + CR_{t+1,0} = \frac{V_{t+1} + \alpha D_{t+1,0}}{V_0} \quad (1)$$

The variable $CR_{t+1,0}$ stands for the cumulative compound rate up until time t+1 for an investor who purchased the share at time 0, where the second subscript 0 stands for the time of purchase of the share. The "1" in t+1 stands for one unit of time which may be any unit of time (e.g., a day, a week, a month, a year, a decade, etc.). Unless otherwise stated, any "expected" variable $Z_{t+1}$ indicated herein (including in the claims) represents an expected or predicted value of Z at time t+1 (i.e., $Z_{t+1}$ is projected forward to time t+1 from the standpoint of time t), wherein t+1 represents any time t+1. Thus, an "expected" value of $Z_t$ represents an expected or predicted value of Z at time t (i.e., $Z_t$ is projected forward to time t from the standpoint of time t−1).

Let $d_{j,0}$ represent the sum of all cash dividends received from time j−1 to j by an initial investor at time 0, and α represents the fraction of cash dividends that are not reinvested. α is assumed to be constant in presently discussed embodiments, but may generally be a function of time. Then $$D_{t+1,0} = \sum_{j=1}^{t+1} d_{j,0},$$

wherein $D_{t+1,0}$ represents the sum of all cash dividends (not reinvested) cumulated up to time t+1. The variable $V_t$ represents the total market value at the end of time t, measured in dollars or by a broad index value such as the S&P 500 or the Wilshire 5000. Note that Equation (1) above can be rewritten as follows:

$$1 + CR_{t+1,0} = \frac{V_{t+1} + \alpha D_{t+1,0}}{V_t + \alpha D_{t,0}} \times \frac{V_t + \alpha D_{t,0}}{V_{t-1} + \alpha D_{t-1,0}} \times \ldots \times \frac{V_1 + \alpha D_{1,0}}{V_0} \quad (2)$$

The annual compounded aggregate nominal market $R_{t+1,0}$ return from time t to t+1 is expressed as follows:

$$1 + R_{t+1,0} = \frac{V_{t+1} + \alpha D_{t+1,0}}{V_t + \alpha D_{t,0}} \quad (3)$$

$R_{t+1,0}$ stands for the yearly compound rate between time t and t+1 for an investor who bought the share at time 0, and again the second subscript stands for the time of entry (i.e., time 0 in Equation (3)). Equation (3) suggests that year-to-year, a basis for computing an ongoing investor's stock market return includes cumulated non-reinvested past dividends and capital gains/losses received. In general, for any period ending at time t, $D_{t,t}=0$ is assumed so that when an investor enters the market at time t, no past dividends have thus far been received. Note that an investor entering the market at time t can increase his or her ownership in shares by the amount of reinvested dividends, and thus expects a first year return in accordance with Equation (4):

$$1 + R_{t+1,t} = \frac{P_{t+1} + d_{t+1,t}}{P_t} \quad (4)$$

$P_{t+1}$ is the expected ex-dividend price per-share from the standpoint of time t, or a broad index's price per-share. In this case $R_{t+1,t}$ represents the discount rate (a percentage), which once applied, determines the value of the stock market at time t, as represented by the present value of future dividends. In other words, at any point in time the value of market equity is determined by initial investors in a manner consistent with the present value of dividends approach. To simplify the notation, an initial investor is assumed to initiate an investment at time zero, and the extra zeros in the preceding notations is dropped for convenience. That is, $R_{t+1,0}$ becomes $R_{t+1}$ and $D_{t,0}$ becomes $D_t$.

Equation (3) that may be rewritten as follows:

$$1 + R_{t+1} = \frac{V_{t+1}}{V_t}\left[\frac{V_{t+1} + \alpha D_{t+1}}{V_{t+1}} \times \frac{V_t}{V_t + \alpha D_t}\right] = \frac{V_{t+1}}{V_t}\left[\frac{1 + \alpha D_{t+1}/V_{t+1}}{1 + \alpha D_t/V_t}\right] \quad (5)$$

Let $E_j$ denote aggregate earnings and $b_j$ denote the payout ratio at end of time j. The payout ratio is the percentage of net earnings paid to equity owners (e.g., shareholders) as a dividend. Since $d_j = b_j E_j$ the book value of market equity is $$B_t = \sum_{j=1}^{t}(1 - \alpha b_j)E_j + B_0.$$

That is, the book value $B_t$ accretes due to retained earnings and reinvested dividends in new shares. Given that the future earnings forecast are already incorporated in the current market value, issuing additional shares in excess of dividend reinvestment would have no effect on either the book value or the total market value. On the other hand, there is a continual process of net creation of new companies in the economy. It is assumed that the initial investor buys these new firms at book value. Since the investor's balance sheet is debited and credited by the same purchase amount, this transaction will leave the existing book value unchanged. A constant payout ratio b is assumed. Alternatively, it may be assumed that the payout ratio b converges in the long-run (i.e., as time becomes very large and theoretically approaches infinity) to the weighted average of yearly payout ratios so as to satisfy:

$$b = \sum_{j=1}^{\infty} b_j e_j \bigg/ \sum_{j=1}^{\infty} e_j.$$

Since stock dividends are debited from retained earnings, the dividends do not affect the computation of book value $B_t$.

Since all cash dividends (even dividends on reinvested dividends) are paid out of total earnings, it follows that:

$$B_t = \sum_{j=1}^{t}(1 - \alpha b_j)E_j + B_0 = \frac{(1-\alpha b)}{b}\sum_{j=1}^{t} d_j + B_0 = \frac{(1-\alpha b)}{b}D_t + B_0 \quad (6)$$

Furthermore, in a long-run steady-state, the market value $V_t$ converges to the book value $B_t$. In other words from Equation (6) above, the ratio $$D_t/V_t$$

converges to the value $$\frac{b}{(1-\alpha b)}.$$

Finally, this implies that Equation (5) becomes:

$$1 + R_{t+1} = \frac{V_{t+1}}{V_t}$$

in the long-run. That is, the stock market compounded return equals the capital gains rate. Furthermore, since the capital gains rate equals nominal GDP growth in the long-run, the stock market return will equal GDP growth. Henceforth, a first key result is proven. The argument herein does not assume away dividends reinvestment. On the contrary, essentially the preceding result follows from the fact that (reinvested) dividends cannot accumulate faster than GDP, and that the basis for year-to-year compounding grows over time, thus pinning the return down to GDP growth.

The long-run growth rate of stock shares equals population growth. Over the period 1926-2000, S&P 500 earnings per-share (EPS) grew at the rate of 5.05% while GDP grew at 6.44%. Since the ratio of corporate profit to GDP is constant in the long-run, net new share growth is obtained as the difference between GDP growth and earnings per-share growth. Over the period, net share growth was 1.39% or about equal to the 1.23% population growth. Similarly, over the period 1945-2002, the growth in total stock market value was 8.40% (using Federal Flow of Funds from the Federal Reserve Board website http://www.federalreserve.gov, whereas it was 7.20% for the S&P 500 over the same period. Since the S&P 500 was a relatively constant fraction of the overall market value (about 60%), and the index is on a per-share basis, it is evident that the difference of 1.2% represents net share growth, again equal to population growth.

It is also logically sensible that net new share growth should equal population growth. In order for new shares to be purchased by individual investors (net of asset substitution), the price per-share cannot grow faster than wage per-capita in the long-run. Otherwise, new shares would eventually become unaffordable. Since total wages and total market value both grow at the rate of GDP, this entails that share growth must at least be population growth. The fractionalization of shares via owning mutual fund shares seems at first glance to be a way around this argument. However, it is the combined growth rate of corporate and mutual fund shares, which must grow at least at the rate of population. Furthermore, mutual fund share growth that would be faster than corporate share growth would mean that new investors get an ever-shrinking share of the stock market, which cannot be a long-run equilibrium. Finally, share growth permanently in excess of population growth would shrink earnings per-share. This would depress current and future stock prices, and would be shunned by wealth-maximizing shareholders.

The per-share total market return equals GDP/capita growth. Using the fact that market value is the product of price times number of shares it may be concluded, using the above analysis, that the total market compound return per-share equals GDP/capita growth.

The RYM identifies a minimum expected required yield (i.e., a minimum rate of return from an asset as dictated by the RYM). While the assumption of a single owner is useful to analyze the aggregate stock return, the pricing of equity is better captured by assuming that the stock market equity is owned by an institutional investor such as a large mutual fund or pension fund with a fixed market share. The situation is similar to examining a large index fund that has reached a steady-state growth path. Since the fund has a dynamic membership, the prior analysis that applied to a single infinitely lived owner needs to be modified slightly. Let the market value at time t of such fund be expressed as $V_t^t = N_t^t \times P_t$; where $N_t^t$ is the number of shares outstanding at time t held by the pool of investors in existence at time t, and P stands for the current ex-dividend price per-share (of the large mutual fund/index). Since the fund's return to its current membership is determined by the value of its holdings before the influx of capital by new members, the market value prior to that increase is in accordance with $V_{t+1}^t = N_{t+1}^t \times P_{t+1}$. Here, $P_{t+1}$ again stands for the expected ex-dividend price per-share from the standpoint of time t, and $N_{t+1}^t$ stands for the number of shares outstanding at t+1 held by the pool of investors in existence at time t. Equation (3) is modified for the compound return as follows:

$$R_{t+1} = \frac{V_{t+1}^t + \alpha D_{t+1}}{V_t^t + \alpha D_t} - 1 \tag{7}$$

In Equation (7), the impact of dividend and capital gains taxes is ignored for now. As shown infra, the main result of this section holds true on an after-tax basis, when for example, tax rates (dividend income, interest income and capital gains) all converge to their cumulative past-weighted averages. For example with respect to Equation (7), let the current market value $V_t^t = \$1$ Trillion and next period's value be $V_{t+1}^t = \$1.11$ Trillion, the cumulated dividends $D_t = \$0.4$ Trillions, and $D_{t+1} = \$0.41$ Trillions. Also with the proportion $\alpha = 0.67$, $R_{t+1} = 9.2\%$ from Equation (7).

Decomposing the market value:

$$R_{t+1} = \frac{P_{t+1} N_{t+1}^t + \alpha D_t + \alpha d_{t+1}}{P_t N_t^t + \alpha D_t} - 1 = \tag{8}$$

$$\frac{(P_{t+1} - P_t) N_{t+1}^t + \alpha d_{t+1}}{P_t N_{t+1}^t} \times \frac{1}{1 + \alpha D_t / V_t^t}$$

The growth of shares held by existing investors at time t can be described as follows:

$$N_{t+1}^t = \left(1 - l_{t+1}^t + \alpha \frac{d_{t+1}}{N_t^t P_{t+1}}\right) N_t^t.$$

That is, the existing generation t of investors will own a net new number of shares at t+1 that comprises their reinvested dividends $$\alpha \frac{d_{t+1}}{P_{t+1}}$$

and the liquidation of stocks (cashing-out due for example to retirement or investing in other asset classes) $l_{t+1}^t N_t^t$. The new total number of shares at time t+1 incorporates the existing investors' stocks $N_{t+1}^t$ and the new investors stocks $S_{t+1} N_t^t$ (net of deaths), where $S_{t+1}$ represents a growth rate of net new investors' shares at time t+1. Consequently, the total demand for shares is given by $N_{t+1}^{t+1} = N_{t+1}^t + S_{t+1} N_t^t$. The total demand for shares equals the reinvested dividends of the old generation and the new generation of investors' demand. On the other hand, it was shown supra that aggregate shares $N_t^t$ grow at the same rate as population. That is, the supply is $N_{t+1}^{t+1} = (1 + n_{t+1}) N_t^t$. In any period, the supply of shares on the market comprises existing shares from members that liquidate their shares, plus new shares created by the economy. Equating supply and demand:

$$n_{t+1} + l_{t+1}^t = S_{t+1} + \alpha \frac{d_{t+1}}{N_t^t P_{t+1}}.$$

Since at the aggregate level, new investor growth equals population growth, which in turns equals net new share growth, it follows that $n_{t+1} = S_{t+1}$. Consequently, the portion of dividends that is reinvested goes to buy shares from investors who are liquidating their fund shares (but only true for t>1 since any first time investment gets its full dividend) is $$l_{t+1}^t = \alpha \frac{d_{t+1}}{N_t^t P_{t+1}},$$

leaving the total number of shares $N_{t+1}^t = N_t^t$ unchanged except for net new share growth. Note that this is only true for t>1 since any first time investment gets its full dividend. Net new members of the fund therefore buy either old shares from sellers or newly created shares in the same amount as if they were buying-up all new shares. This implies that only the portion of dividends $\alpha d_{t+1}$ contributes to increase the one-period return at the fund level. If this were otherwise, new members would get either an ever-decreasing or increasing portion of share ownership within the fund, which is not sustainable. This implies that Equation (8) becomes:

$$R_{t+1} = \tag{9}$$

$$\frac{P_{t+1} N_t^t + \alpha D_t + \alpha d_{t+1}}{P_t N_t^t + \alpha D_t} - 1 = \frac{(P_{t+1} - P_t) N_t^t + \alpha d_{t+1}}{P_t N_t^t} \times \frac{1}{1 + \alpha D_t / V_t^t}$$

Let $b_{t+1}$ be the deterministic payout rate (a percentage) and $$e_{t+1} = \frac{E_{t+1}}{N_t^t}$$

be the expected earnings per-share (measured in dollars, and captured for example by S&P forward earnings estimates on a yearly or quarterly basis, or by any other source such as First Call or I/B/E/S). For example, the S&P 500 one-year forward earnings was $54.64 in the third quarter of 2002, and the index value per-share was 854.63 for that same quarter. Thus, the forward earnings yield equaled 6.4% at the time. Equation (9) can be rewritten as:

$$R_{t+1} = \left[\frac{\alpha b_{t+1} e_{t+1}}{P_t} + E(g_{t+1})\right] \times \frac{1}{1 + \alpha D_t / V_t^t} \tag{10}$$

The expression $E(g_{t+1})$ represents the expected rate of nominal capital gains per-share. Employing a simple algebraic manipulation, Equation (1) is rewritten as a function of the expected forward earnings yield $$R_{t+1} = \left[\frac{e_{t+1}}{P_t} + E(g_{t+1}) - g_{ct+1}\right] \times \frac{1}{1 + \alpha D_t / V_t^t} \quad (11)$$

as follows:

$$\frac{e_{t+1}}{P_t}$$

The variable $$g_{ct+1} = (1 - \alpha b_{t+1})\frac{e_{t+1}}{P_t}$$

represents the expected retained earnings as a fraction of the current stock price. The variable $$g_{ct+1} = (1 - \alpha b_{t+1})\frac{e_{t+1}}{P_t}$$

is akin to a sustainable growth rate based on market price rather than book value per-share.

It is next shown that a rational institutional investor will base his capital gains expectations about the market (S&P 500) so that $E(g_{t+1}) - g_{ct+1} \geq 0$. That is, there is indeed a minimum expected capital gains rate at the market level, which is equal to the expected retained earnings yield $g_{ct+1}$. In other words, the present value of expected growth opportunities cannot be negative at the market level, which may be argued by contradiction. If $E(g_{t+1}) - g_{ct+1} \leq 0$ were true, an investor would anticipate that the dollars value of next period's capital gains is lower than the value of earnings to be reinvested, or that the expected return on reinvested earnings is negative. From the standpoint of a rational investor, it is better to gain from share buybacks or to receive more dividends rather than to reinvest earnings. Since de-trended corporate profits exhibit a mean reversion property on average for the economy and earnings growth converges to GDP growth, a potential strategy at the market level with a controlling majority of index shares is to adopt a 100% dividend payout ratio. See Fama, Eugene F. and Kenneth R. French, "Forecasting Profitability and Earnings," *Journal of Business*, 73 (2): 161-175 (April 2000), who show that profits and earnings exhibit a mean reversion property when normalized by asset size, which serves as a de-trending variable, for a large sample of firms recorded in Compustat over 1964-1996. In other words, a short-term increase in expected dividends would raise the value of shareholders' equity, which is impossible under Miller-Modigliani's irrelevance of dividend policy theorem. See Miller, Merton and Franco Modigliani, 1961, "Dividend Policy, Growth and the Valuation of Shares," *Journal of Business*, 34: 411-433 (October 1961). Consequently, the condition $E(g_{t+1}) \geq g_{ct+1}$ must hold.

Thus, from a large institutional investor's standpoint there is a minimum expected required yield $R_{min\ t+1}$ based on the best use of retained earnings ex-ante, in every period. Another way to see that this is true is if, at the market level, investors create a perpetuity paying next period's earnings forever, by financing earnings deficits using debt against future growing earnings. Mathematically:

$$R_{mint+1} = \frac{e_{t+1}}{P_t} \times \frac{1}{1 + \alpha D_t / V_t^t} \quad (12)$$

From Equation (12), the minimum expected required yield on equity is a direct function of expected forward earnings yield. This has two important implications: 1) from the standpoint of a first time investor the forward earnings yield equals the minimum expected required yield, since $D_0$ equals zero; and 2) as seen infra, in the long-run the minimum expected required yield equals GDP/capita growth.

The long-run minimum expected required yield equals GDP/Capita Growth. Examining Equation (12) in the long-run, the ratio $$\frac{1}{1 + \alpha D_t / V_t^t}$$

converges to a constant retention ratio (1-$\alpha$b). This result remains valid in the case of a large fund/index, since dividend reinvestment goes exactly into buying the shares from members leaving the fund and cashing out, which does not affect share growth. Thus, cumulated non-reinvested dividends constitute a fraction $$\frac{b}{(1 - \alpha b)}$$

of the total book value (without new shares). On the other hand, in the long-run, since shares grow at the rate of population growth, the earnings per-share sustainable growth rate is given by $g_y + \tau$, with $g_y$ representing real GDP/capita growth (measure which is obtained for example, by computing the growth rate over a historical period using nominal GDP from the Federal Reserve Board website http://www.federalreserve.gov/). The variable $\tau$ is the long-term inflation rate (measured using an historical average of inflation rates where inflation is measured by an increase in a price index such as the CPI or GDP-deflator available from the Federal Reserve Board website http://www.federalreserve.gov/). Since book value per share and earnings per share grow at the same rate, with ROE being the return on per-share equity, it follows that: $g_y + \tau = (1-\alpha b) \times ROE$. Thus, the forward earnings yield $$\frac{e_{t+1}}{P_t}$$

converges to the ROE per-share and consequently to the value $$\frac{g_y + \pi}{(1 - \alpha b)}.$$

Substituting the preceding converged values of $$\frac{1}{1 + \alpha D_t / V_t^t} \text{ and } \frac{e_{t+1}}{P_t}$$

in Equation (12) results in: $\lim_{t \to \infty} R_{min\ t+1} = g_y + \tau$. Hence, an average long-term investor (e.g., member of the large fund)

obtains a real minimum compounded return per-share that is equal to real GDP/capita growth. Since it is also true that the forward earnings yield converges to the total return per-share, the average long term-investor will earn real GDP/capita growth as their compounded rate per-share. The long-term average real GDP per-capita growth rate for developed countries found by Pritchett (1997) is about 1.5%, which is just lower than the actual U.S. rate of 2.07% (using a 1.33% population/share growth rate) for the period 1926-2001, and the average inflation rate has been 3.15% over the same period. See Prichett, Lant, "Divergence, Big Time," *Journal of Economic Perspectives*, 11: 3-17 (Summer 1977). Any other estimate of this growth rate and inflation rate arrived at through historical analysis or other means, can also be applied here. It is worth noting that the overall growth of the value of the fund incorporates population growth so that the fund including new shares as part of the new market value will grow at the same rate as GDP.

Next, it is argued that large institutional investors or investment pools that own a majority of the total stock market play an instrumental role in determining the valuation of the stock market or representative broad market index. Consider the case of a large fund buying additional stock market shares at time t, while having a long-term investment horizon. For these new shares, the funds' first-year minimum expected required return per-share is $$R_{min\,t+1} = \frac{e_{t+1}}{P_t}.$$

Every investor (small or large, short-term or long-term oriented) can at minimum replicate the compounded return available to an index fund in the long-run, that is GDP/capita growth. Every investor seeks to maximize his/her cumulated after-tax real per-share return, over his/her investment horizon. At any point in time, competition amongst long-term and short-term oriented investors drives long-term investors to bid the index up to the point where their instantaneous minimum expected return is pushed down to GDP/capita growth, the smallest acceptable return. Thus, long-term investors will bid the index price up so that on an after-tax and inflation basis, the initial forward earnings yield equals real per-capita GDP growth rate.

A rational marginal investor cannot submit bids that are arbitrarily disconnected from large institutional long-term investors bids. Since all investors can guarantee at least a compounding return equal to GDP/capita growth if they invest in the long-run, short-run investors will tend to outbid long-term investors in the context of "irrational exuberance" about stock prices, that is when expectations of short-term capital gains and earnings growth outpace trend-GDP growth. On the other hand, long-term investors outbid short-term investors IF the latter are concerned with short-term depressed earnings and factor a risk premium in their bids. Thus, the actual value of a stock index cannot deviate far from the bid submitted by large institutional investors.

A simple arbitrage argument shows that the minimum expected yield defined above must also be commensurate with the minimum expected real bond rate obtainable (which turns out to be the maximum expected real risk free rate $r_{bt+1}$) over the long-term investment horizon. Since nominal returns are taxed, the after tax version of this arbitrage condition in nominal terms is expressed as follows:

$$\frac{e_{t+1}}{P_t} = \frac{\text{Max}(g_y + \pi_{t+1}; (1 - \tau_{it+1}) + R_{bt+1})RP_{t+1}}{1 - \tau_{dt+1}b_{t+1} - \tau_{ct+1}(1 - b_{t+1})} \quad (13)$$

$\tau_{t+1}$ is the expected inflation rate, which can be estimated for example, by using forecasting statistical methods, or by using forecasts such as recorded in the survey of professional forecasters from the St Louis Fed. $R_{bt+1}$ is the nominal T-bond rate (or equivalent risk-free instrument), and $\tau_{it+1}$ and $\tau_{dt+1}$ respectively represent the average marginal tax rates for interest income and dividend income. The top marginal capital gains tax rate is $\tau_{ct+1}$. (These tax rates are available for example from the IRS website http://www.irs.gov/taxstats/index.html or from the NBER. Ordinary income marginal tax rates can also be used as surrogates). Equation (13) states that the after tax (capital gains and dividend) expected nominal earnings yield equals the maximum between the long term real GDP/capita growth rate indexed for inflation and the after-tax long-term T-Bond rate. The variable $RP_{t+1}$/represents a premium that is positive due to short-term earnings downside volatility or inflation upside volatility.

When stock prices are determined at the margin by competing long-term investors, then the risk premium is not a function of short-term volatility, but rather a function of the long-term differential in compounded returns between stocks and bonds. The equity premium as measured as the difference between the long-term compound return per-share (GDP/capita growth) and 10-year Treasuries long-term returns is almost zero, since the 10-year Treasury yield from 1926-2000 was 5.28% and the GDP/capita growth was 5.18% a difference of 0.10%. Using Federal Flow of Funds (FFF) data for the period 1945-2002, it follows that the compounded return using Equation (3) averaged 6.2% per-capita over the period for the entire corporate equity market. This was identical to the S&P 500 return also equal to 6.2% (using Standard and Poors Index data) vs. 5.9% for nominal GDP/capita growth and 5.95% for the 10-year Treasury.

Since cumulated dividends are on a per-share basis for the S&P 500, a correction is needed for the possible effect of reinvested dividends. It is assumed that S&P 500 dividends have accumulated in the same proportion as in the FFF, when compared to final 2002 market values. This proportion equals 46.2% and the estimated cumulated dividends are $420M. This calculation assumes starting with cumulated dividends from 1871-1945. In addition, it is assumed that 67% of dividends were retained based on the ratio of the dividend-price ratio 4.2% (maximum reinvestment rate) minus the actual share growth 1.39% over the period, divided by 4.2%.

That the equity risk premium is zero is true in the long-run, as price uncertainty is mostly resolved in the long-run, and both instruments should yield the same compounded return. In that context, it is adduced that when long-term investors dominate the market, the risk premium $RP_{t+1}$ is zero. Finally, $$\frac{e_{t+1}}{P_t} = \frac{\text{Max}(g_y + \pi_{t+1}; (1 - \tau_{it+1}) + R_{bt+1})}{1 - \tau_{dt+1}b_{t+1} - \tau_{ct+1}(1 - b_{t+1})} \quad (14)$$

For example, actual first quarter 1996 US data are used. Assume an expected annual inflation estimate of 2.38% and a forward earnings per-share estimate of $42.52. The after-tax 10-year Treasury yield=4.18% (in this case the after-tax real T-bond yield is less than our long-term productivity estimate of 2.07%), a dividend marginal tax rate=28.9%, and a capital gains tax rate=29.19% with a dividend payout=41.7%. The resulting earnings yield using Equation (14) is 6.3% and the estimated price P=677.75. The actual figures for the S&P 500 were 6.9% for the forward earnings yield, and an index value of 614.42.

The following discussion derives the general Required Yield Method Equation (14) with incorporation of taxes (see infra Equation (A10)). The first step is to show that in the long-run on an after tax basis the minimum real expected return converges to the real GDP/capita growth rate. Starting out from a definition of the compounded after-tax (long-term capital gains and dividend) expected stock return and dropping the superscripts so that $N_t^t = N_t$ and $V_t^t = V_t$:

$$R_{t+1} = \frac{\tau_{ct+1}N_t(P_{t+1} - P_t) + (1 - \overline{\tau}_{dt})\alpha D_t - \overline{\tau}_{ct}(N_tP_t - P_0)}{N_tP_t + (1 - \overline{\tau}_{dt})D_t - \overline{\tau}_{ct}(N_tP_t - P_0)} - 1 \quad (A1)$$

The tax rates are the average marginal tax rates for dividend income $\tau_{dt+1}$ and the top marginal capital gains tax rate $\tau_{ct+1}$. The marginal tax rates $\overline{\tau}_{dt}$ and $\overline{\tau}_{ct}$ are respectively weighted averages of past tax-rates, defined as follows:

$$\overline{\tau}_{dt}D_t = \sum_{j=0}^{t} \tau_{dj}d_j \quad \text{and} \quad (A2)$$

$$\overline{\tau}_{ct}(N_tP_t - P_0) = \sum_{j=0}^{t-1} \tau_{cj+1}(N_{j+1}P_{j+1} - N_jP_j)$$

Equation (A1) can be rewritten as:

$$R_{t+1} = \frac{[(1 - \tau_{dt+1})b_{t+1} + (1 - \tau_{ct+1})(1 - \alpha b_{t+1})]e_{t+1}/P_t +}{(1 - \overline{\tau}_{dt})\alpha D_t/V_t + (1 - \overline{\tau}_{ct}) - P_0/V_t} \quad (A3)$$

where $$g_{ct+1} = (1 - \alpha b_{t+1})\frac{e_{t+1}}{P_t} \quad \text{and} \quad E(g_{t+1}) = \frac{P_{t+1} - P_t}{P_t}.$$

As shown supra, in the long-run, the ratio $$D_t/V_t$$

converges to the value $$\frac{b}{(1 - \alpha b)}$$

and the price $P_t$ goes to infinity. Assume that the tax rates $\tau_d$, $\overline{\tau}_{dt}$, $\overline{\tau}_{ct}$ and converge to respective constants $\overline{\tau}_d$ and $\overline{\tau}_c$, and assume that the payout ratio $b_{t+1}$ converges to a constant b. This implies that for a large horizon t, Equation (A3) becomes:

$$R_{t+1} = \frac{[(1 - \tau_d)\alpha b - \overline{\tau}_c(1 - \alpha b)]e_{t+1}/P_t +}{(1 - \overline{\tau}_d)\alpha b/(1 - \alpha b) + (1 - \overline{\tau}_c)} \quad (A4)$$

It follows from Equation (A4) that the minimum expected stock return is obtained when $E(g_{t+1}) - g_{ct+1} = 0$; in other words:

$$R_{min\,t+1} = \frac{(1 - \alpha b)e_{t+1}}{P_t} \quad (A5)$$

Since the forward earnings yield must satisfy $$\lim_{t \to \infty} \frac{e_{t+1}}{P_t} = \frac{g_y + \pi}{(1 - \alpha b)},$$

it follows that:

$$\lim_{t \to \infty} R_{min\,t+1} = \lim_{t \to \infty} \frac{(1 - \alpha b)e_{t+1}}{P_t} = g_y + \pi \quad (A6)$$

The second step is to express the minimum expected return for a first time investor. Using Equation (A1) again and assuming that no prior dividends and no taxes were paid, it follows that:

$$R_1 = \frac{(1 - \tau_{d1})d_1 + P_1 - \tau_{c1}(P_1 - P_0)}{P_0} - 1 \quad (A7)$$

In other words, following the same steps as previously:

$$R_{min\,1} = [1 - \tau_{d1}b_1 - (1 - b_1)\tau_{c1}]\frac{e_1}{P_0} \quad (A8)$$

A simple arbitrage argument is that long-term investors will bid the highest price until the expected minimum return equals real long-term GDP/capita growth indexed for expected inflation and taxes. On the other hand, long-term T-bonds also compete to provide a minimum expected return. Thus, on an after tax basis, and in every period where long-term investors buys new shares:

$$\frac{e_{t+1}}{P_t} = \frac{\text{Max}(g_y + \pi_{t+1}; (1 - \tau_{it+1})R_{bt+1} + RP_{t+1})}{1 - \tau_{dt+1}b_{t+1} - \tau_{ct+1}(1 - b_{t+1})} \quad (A9)$$

where $\pi_{t+1}$ is the expected inflation rate, $R_{bt+1}$ is the nominal T-bond rate, and $\tau_{it+1}$ represents the average marginal tax rate for interest income. Finally, it can be assumed that the premium $RP_{t+1}$ is zero, since long-term investors are insensitive to short term stock price fluctuations. Thus:

$$\frac{e_{t+1}}{P_t} = \frac{\text{Max}(g_y + \pi_{t+1}; (1 - \tau_{it+1})R_{bt+1})}{1 - \tau_{dt+1}b_{t+1} - \tau_{ct+1}(1 - b_{t+1})} \quad (A10)$$

which proves Equation (14) for incorporation of taxes.

The Required Yield Method (RYM) shows that stock market equity as captured by a broad index or representative diversified index of the entire stock market equity, is priced to yield an after tax and inflation minimum expected real return equal to the long-term real GDP growth rate. This mechanism provides the crucial link between equity return and GDP growth, is instantaneous, and practiced by the marginal (long-term) investor. According to the RYM, the forward earnings yield ratio of a broad index provides an essentially constant minimum after-tax real return equal to the greater of the long-term real per-capita productivity rate and a real after-tax long-term bond rate.

In this section, the RYM valuation Equation (14) is tested in application to the S&P 500. The testing period is January 1954-September 2002 for monthly data and Q1-1970 to Q3-2002 for quarterly data. Historical trailing earnings per-share, dividend per-share and prices are for the S&P 500. The forward earnings per-share monthly estimates from Thomson Financial over the 1979-2002 period are used. Prior to 1979, current earnings per-share are used as an estimate of expected earnings. Expected inflation estimates are captured on a quarterly basis by the Survey of Professional Forecasters available from the Federal Reserve Bank of Philadelphia website http://www.phil.frb.org/econ/forecast/ for the period 1970-2002. When measured on a monthly basis, the quarterly estimate is applied to each of the three months within the quarter. Prior to 1970, the trailing 12 months CPI based inflation rate is used as a proxy for expected inflation. For results based on quarterly data, the present invention uses the GDP deflator index, which is only available on a quarterly basis and is consistent with the Survey of Professional Forecasters. Furthermore, after 1970, in each quarter, annual earnings are reconstructed by summing the available last four quarterly earnings.

FIG. 1 is a table in which the performance of the RYM (i.e., $e_{t+1}/P_t$ in Equation (11)) is compared with the performance of the Fed Model for valuing the S&P 500 index, in accordance with embodiments of the present invention. For each observation, the percentage tracking error is computed as ABS (FairP$_t$-P$_t$)/P$_t$, where FairP$_t$ represents the estimated S&P 500 index value using either the Fed Model or RYM formulas. FIG. 1 also includes the mean percentage tracking error for each model, and various periods.

In general, the RYM formula leads to a smaller tracking error than does the Fed Model. Over the entire period on a monthly basis, the mean percentage error drops by 35% compared to the Fed Model. On a quarterly basis, the mean percentage error decreases by about 52% compared to the Fed Model. Note that overall the RYM performs better than the Fed Model except when the market period chosen is 1990-2002, during which the Tech Bubble occurred. In the case of period 1990-2002, both models predict that the market was severely overvalued from 1998 until 2000, and they both perform relatively badly in terms of tracking error. Note though, that when an average of one year and two year forward expected earnings is used after 1990 as a proxy to forward earnings (earnings expectations rose dramatically during this period), the descriptive power of the RYM is significantly increased. The mean percentage error becomes 11.9% for the RYM vs. 13.2% for the Fed Model over 1990-2002 on a quarterly basis (assuming a 2.07% GDP/capita growth rate). FIG. 1 also shows two types of results for the RYM depending on the assumption about the long-term real GDP/capita growth rate. The first value used is the 2.07% US growth rate over 1926-2001. The second value is 1.5%, which is the estimated average real GDP/capita growth rate for a group of OECD members. See Pritchett, Lant, "Divergence, Big Time," *Journal of Economic Perspectives*, 11: 3-17 (Summer 1977).

This sensitivity analysis shows that the results are overall quite comparable when using either value as the estimate of long-term growth. The fact that a slightly better fit is obtained on a quarterly basis using the global developed nations productivity rate, may point to the possibility of a global productivity-based arbitrage. Investors in lower productivity countries may bid up assets in higher productivity countries to meet a global real required return.

In order to further assess the relative performance of the RYM, its ability to predict price movements is examined, based on the simple valuation rule that the market is undervalued when the actual S&P price falls below the fair value according to the RYM (or alternatively the Fed Model FED). Ordinary Least Squares (OLS) regressions of the differential between estimated fair value and actual S&P index are run against the differential of the index value at a future date (alternatively one, two and up to fourteen months ahead) minus the current index. The performance of the RYM and the Fed Model are tested prior to 1997, since during the 1997-2000 Tech Bubble the delay in market correction is not reflective of 'normal' periods market price adjustments. However, this does not diminish the power of either model as they both correctly predicted overvaluation during the 1997-2000 period.

FIG. 2 is a table showing stock market price movements for the RYM and the Fed Model, in accordance with embodiments of the present invention. FIG. 2 utilizes a 2.07% GDP/capita growth rate assumption. Based on the adjusted R-square and t-statistics, the RYM is able to predict stock market price movements about two to three times more accurately than the Fed Model, over the period 1970-1997 and especially when the lead-time is between four and five months. Over the 1954-1997 period, the results are more mitigated, as both models seem to perform somewhat equally with an optimal lead-time of thirteen to fourteen months.

Figure 4:
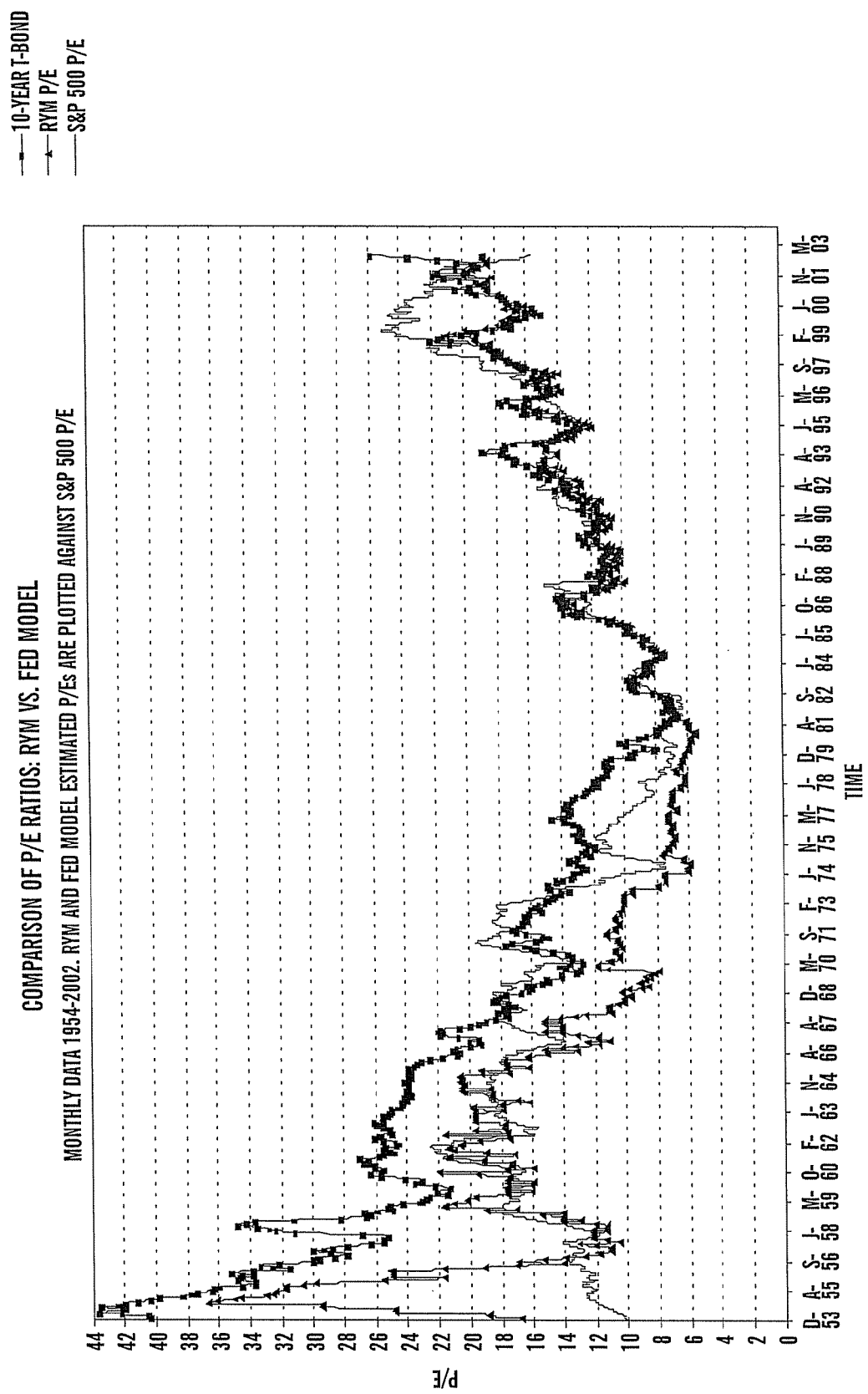

FIG. 3 and FIG. 4 respectively graphically illustrate the tracking of the S&P 500 index and Price/Earnings (P/E) ratios, using the RYM valuation formula vs. the Fed Model over the period 1954-2002 using quarterly data, in accordance with embodiments of the present invention. Utilized are forward expected earnings from Thomson Financial after 1979 and an average of 1 year forward and 2-year forward S&P estimates after 1990. It is interesting to note that the RYM seems to track the S&P 500 much more accurately than the Fed Model prior to the 1970s. It is well documented that the 10-year T-Bond was uncorrelated with the S&P 500 earnings yield prior to 1970 but moved closely with the earnings yield after that. Here, it is observed that the RYM predicts values on par with the S&P 500 P/E ratio and the index value from about 1955 until 1970.

If an equity premium for risk was inherent in equity valuation, then a Fed 'type' Model to which a risk premium is added should more accurately correlate to actual prices. Just as a junk bond yield includes a default rate premium in addition to a term-adjusted risk-free rate; a required stock yield must incorporate a default risk premium greater than the debt grade for the same risk class since equity comes after debt in recovery. Thus, while at the aggregate, the stock market does not default; the mix of risk-adjusted companies at any given time in the economy may affect the required yield. The RYM formula predicts that in the long-run, the expected S&P 500 index capital gains is equal to the expected EPS growth rate, under the condition that the inflation and tax rates are stable. Furthermore, from a long-term investor perspective on a compounded basis, stocks and T-bonds return the same in real terms and after tax. Moreover, the addition of any positive risk premium should perform at least as well than if none were included, if risk is present in equity valuation relative to a risk-free benchmark. Nevertheless, any added risk premium of the magnitude proposed in the literature would substantially shift estimated valuation levels below that predicted by the RYM formula and thus would raise the overall average percentage tracking error and result in a compounded stock return that far exceeds GDP growth, which is impossible.

Next, risk or volatility is incorporated into the present invention. Since traditional valuation models discount dividend streams to arrive at fair equity value, and that both the growth of dividends and the discount rate are stable in the long-term, no significant fluctuations in equity prices can be predicted due to short-term earnings or interest rate changes. This problem has been well documented by Shiller, Robert J., "Do Stock Prices Move Too Much to be Justified by Subsequent Changes in Dividends?" *The American Economic Review*, 71 (3): 421-436 (June 1981). The RYM predicts and explains low frequency (monthly and quarterly) volatility in terms of the changing expectations about earnings, inflation and taxes. The "Fed Model" and related approaches also predict volatility, but do so without theoretically or empirically dealing with the risk premium, dividend, and earnings growth, and how the equity yield is related to a risk-free rate and tax differences between tax on interest, dividends and capital gains.

2. Gold and Foreign Exchange (RY Parity) Valuation

Assessing the fair value of gold largely remains a mystery in Finance. While in some instances the existing literature has found empirical relationships between gold prices and macroeconomic variables such as inflation and exchange rates, little evidence has been offered for connections between gold and other asset classes. To date, there is no comprehensive theory of gold valuation showing how inflation, exchange rates and other asset classes may together affect gold pricing; or how gold and other asset classes may be affected by common underlying factors.

The present invention presents a gold asset pricing theory that treats gold as a store of wealth and demonstrates a theoretical and empirical link between gold price, inflation, and foreign exchange rates and the general valuation of the stock market. The inventive approach is based on a generalization of the Required Yield Method. Since gold fulfills the unique function of a global store of value, its yield varies inversely to the yield required by any financial asset class, thus providing a hedge in the case where such assets are losing value. Our theory explains about 88% of actual US Dollar ($USD) gold prices and 92% of actual gold returns on a quarterly basis, including the peak prices of gold, over the 1979-2002 period.

Figure 5:
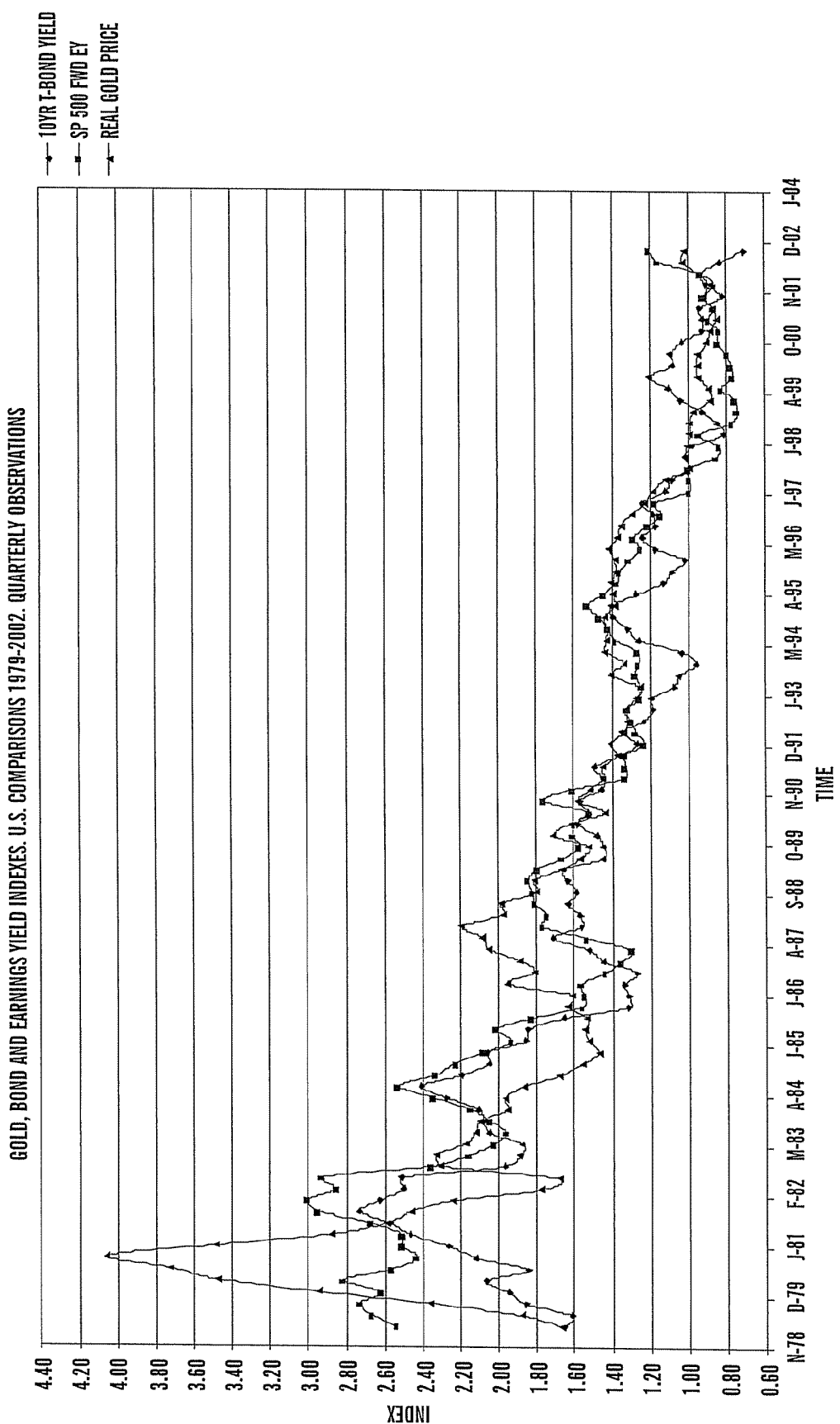
FIG. 5 graphically depicts the real (inflation-adjusted) gold price index bond yield and earnings yield indexes over the period 1979-2002 using quarterly observations.

A preliminary empirical investigation of the price of gold reveals a non-trivial connection between real gold prices and the US stock market. FIG. 5 graphically depicts gold and bond yield indexes over the period 1979-2002. FIG. 5 shows that gold's real price varies inversely to the S&P 500 P/E, and thus with the earnings-to-price ratio. FIG. 5 shows the high correlation between indexed USD real gold prices, inverse S&P 500 forward P/E ratio, and 10-year T-Bond, over the period 1979-2002. The theory developed infra predicts and explains this high level of correlation based on viewing gold as a global store of value.

Throughout the history of civilization, gold has been the single most important global store of value. To this day, gold fulfills this unique function. For the purpose of extending the Required Yield Method to gold pricing, the present invention postulates the following conditions: 1) the global real price of gold essentially is a real P/E ratio for gold, where "earnings" represent purchasing power or a global price index; 2) the global real price of gold varies inversely to all other main financial asset classes' real P/E to preserve the real value of any investor's capital against adverse movements in the values of financial asset classes; 3) Law of One Price: exchange rate fluctuations must impact local currency-denominated gold prices to eliminate potential international gold arbitrages; and 4) mining supply must be stable in relation to supply movements in the aboveground stock, and the worldwide stock of gold per-capita should not increase in the long-run.

The present invention assumes that the main alternate investment asset class is a stock market index. Since gold is a global hedging tool, condition 2) supra states that the global real price of gold varies inversely with the global stock market forward P/E. The gold valuation theory of the present invention is constructed by making use of condition 2) in addition to connecting a global stock market earnings yield to a global nominal return. In order to establish this connection, the present invention utilizes the Required Yield Method (RYM), which theoretically shows that at any point in time, a country's after-tax stock market forward earnings yield can be viewed as a minimum expected return. Furthermore, this forward yield equals a required yield given by the sum of the country's GDP/capita long-term growth rate and its current expected inflation rate.

Since the forward yield based on the RYM is applicable to any country, it must also apply to a GDP-weighted average of any given set of countries' earnings yields. In other words, when applied to a broad representative set of countries to approximate the global economy, a global stock index after-tax forward earnings yield must equal a global required yield $RY_{wt+1}$ given by:

$$RY_{wt+1} = g_w + \pi_{wt+1} \quad (15)$$

where $g_w$ stands for the global GDP/capita long-term growth rate and $\pi_{wt+1}$ is the expected global inflation rate, each variable being determined as respective GDP weighted averages of a representative set of countries' long-term growth rates and current expected inflation rates. Since condition 2) supra states that the real global price of gold is inversely related to the stock index real P/E, the real global price of gold co-varies directly with the global real required yield, as implied by the Required Yield Method (RYM). Let the global gold price be denoted by $P_{wt}$ (for example measured in dollars) and let $\tilde{P}_{wt}$ represent gold's real global price, that is the price of gold divided by the current global price index. This implies that on an after-tax basis, the real price of gold is proportional to the RY subject to a constant C:

$$\tilde{P}_{wt} = C \times \frac{RY_{wt+1}}{(1+\pi_{wt+1})} = C \times \frac{g_w + \pi_{wt+1}}{(1+\pi_{wt+1})} \quad (16)$$

A value of $8929 may be used for the constant C, which is obtained as the intercept of the regression of the ratio of actual real price over the right hand side of Equation (21) infra on a time trend, on a quarterly basis over 1979-2002. Other values for the constant C are possible given historical updates. The interpretation of the constant C is as the real value of a perpetuity paying one ounce of gold every year forever, under stable inflation and real long-term productivity. Consider a perpetuity that pays the holder one ounce of gold every year forever. The expected value of an ounce of gold is given by $E(P_{wt+1})$. Let the general price deflator be denoted as $Def_{wt}$. Let tilde variables denote real variables. For example, the real price $\tilde{P}_{wt}$ represents the global price $P_{wt}$ divided by the global GDP deflator at time t. It is straightforward to see that the inverse of the required yield is a required forward P/E ratio, and thus that forward (gold) annuity payments $E(P_{wt+1})$ times a forward P/E equals the value of the above-described perpetuity. Using Equation (16) to express the real value $\hat{V}_{wt}$ of this perpetuity:

$$\tilde{V}_{wt} = \frac{E(P_{wt+1})}{Def_{wt}} \times \left(\frac{P}{e}\right)_{wt+1} = E(\tilde{P}_{wt+1}) \times \frac{(1+\pi_{wt+1})}{RY_{wt+1}} = C \times \frac{E(\tilde{P}_{wt+1})}{\tilde{P}_{wt}} \quad (17)$$

Equation (17) states that the real value of this perpetuity increases with the appreciation of the real price of gold. Whenever inflation and the real long-term productivity are stable, the real value of this perpetuity turns out to be the constant C. In other words, the real price of gold is determined in relation to the required P/E in order to conserve the value of this perpetuity. Equation (17) facilitates a determination of the constant long-run real price of gold by multiplying the constant C (assumed to equal $8929 for illustration) by the real required yield of 1.5% plus long-term global inflation at 4.2% divided by (1+4.2%) to obtain a 5.47% yield. Based on the preceding sample, an estimate of the long-term real global gold price of $488 per ounce is obtained.

Let $\tilde{P}_t$ and $\tilde{P}_{Xt}$ respectively denote the domestic and rest of the world real gold prices at time t; i.e. deflated by each respective region's GDP deflator. Let $\pi_{t+1}$ and $\pi_{Xt+1}$ respectively denote the domestic and rest of the world expected inflation rates. Let $\theta_t$ denote the relative nominal GDP weight of the domestic economy in the global economy, and let $\tilde{s}_t$ denote the real exchange rate (1 real unit of foreign basket equals $\tilde{s}_t$ real unit of domestic basket). Let $\tilde{s}_{t+1}^e$ be real expected spot rates. The global real price of gold is defined as follows:

$$\tilde{P}_{Wt} = \theta_t \tilde{P}_t + (1-\theta_t) \tilde{P}_{Xt} \quad (18)$$

The global real price of gold is a weighted average of home and rest of the world real prices weighted by each bloc's nominal GDP relative weight in the global economy. Given the Law of One Price, it follows that:

$$\tilde{P}_{Xt} = \frac{\tilde{P}_t}{\tilde{s}_t} \quad (19)$$

Obviously when Purchasing Power Parity (PPP) holds $\tilde{s}_t = 1$, and combining Equations (18) and (19) leads to:

$$\tilde{P}_{Xt} = \tilde{P}_t = \tilde{P}_{wt} \quad (20)$$

On the other hand, if PPP is not assumed, and after combining Equations (16), (18) and (20) together, the real domestic price of gold becomes a function of the global required yield as such:

$$\tilde{P}_t = \frac{1}{(1+\pi_{wt+1})} \times \frac{C \times RY_{wt+1}}{\theta_t + (1-\theta_t) \times 1/\tilde{s}_t} \quad (21)$$

Next, a RYM of currency valuation is developed. In order to extend the above result to local (i.e., domestic) currency denominated gold prices, the relative importance of each country in the global economy as well as the effect of currency exchange rates is taken into account. The global economy is divided into two blocs: the home country and rest of the world defined as the bloc of countries X ("foreign bloc"). Let $RY_{t+1}$ and $RY_{Xt+1}$ respectively denote the required yield in the domestic country and foreign bloc. Since the concept of required yield is tied to the concept of forward earnings yield, the present invention puts forth a new exchange rate parity condition that depends on comparing stock market P/E ratios across countries. Let $s_t$ denote the domestic spot exchange rate (1 unit foreign basket equals $s_t$ domestic) at time t, and let $s_{t+1}^e$ denote the expected spot exchange rate at time t+1. Assuming that there is no risk premium associated with investing in foreign assets:

$$\frac{s_{t+1}^e}{s_t} = \frac{RY_{t+1}}{RY_{Xt+1}} \quad (22)$$

where Equation (15) may be used to calculate $RY_{t+1}$ (pertinent to the domestic country) and $RY_{Xt+1}$ (pertinent to the foreign bloc). That is, $RY_{t+1}$ may be calculated as the sum of the GDP growth rate of the domestic country and the expected inflation rate of the domestic country at time t+1, whereas $RY_{Xt+1}$ may be calculated as the sum of the GDP growth rate of the foreign bloc and the expected inflation rate of the foreign bloc at time t+1.

Currency may be viewed as an asset, so that an investor may purchase currency in a domestic country or foreign bloc with the expectation of earning a profit based on a change in the exchange rate between the domestic and foreign currencies as predicted by Equation (22).

Equation (22) is a new parity rule based on required yields. This rule is derived by considering that stock indexes are homogenous commodities and consequently that index values and forward earnings equate across nations, after currency exchange. While Required Yield parity and purchasing power parity (PPP), as it applies to general price indexes, are directionally consistent, the magnitude of exchange rate fluctuations implied by this new rule is far greater than that of PPP especially over the short-term. These two rules, i.e. the Purchasing Power Parity and the Required Yield Parity, will have similar effects only if inflation is stable and low in both the domestic country and rest of the world.

Combining the above equations (21), (22) and the definitions of $RY_{wt+1}$ and $\pi_{wt+1}$ as GDP-weighted averages, it follows that:

$$\tilde{P}_t = \frac{C \times RY_{t+1}}{(1+\pi_{t+1})} \times \frac{\theta_t + (1-\theta_t) \times \tilde{s}_t/\tilde{s}_{t+1}^e}{\theta_t + (1-\theta_t) \times 1/\tilde{s}_t} \quad (23)$$

For example, assume that the foreign real exchange remains unchanged, but that the domestic RY goes from 4% to 6%, with a corresponding increase in expected inflation from 2.5% to 4.5%. In that case, when applying the historical empirical value for the constant C=$8929 (or close empirical estimates), the real price of gold rises from $348.4 to $512.7 using Equation (23).

Inputs for Equation (23) are obtainable from various sources. Nominal and real (CPI-adjusted) spot direct exchange rates are obtained from the US department of Agriculture and compiled from the International Financial Statistics of the International Monetary Fund and Financial Statistics of the Federal Reserve Board. These are used to determine the global real and nominal dollars gold prices from 1971-2003. A group representative of non-U.S. countries can be: Euro zone, UK, Australia and Japan (although other choices are applicable). The spot and ex-post future spot rates for the $USD against the basket of foreign currencies may be used. U.S. Inflation is USGDP deflator (quarterly/annualized) and USGDP deflator one-year ahead forecasts from the BEA available only since 1979. Prior to 1979, actual GDP inflation rates are used instead of GDP deflator forecasts. Other forecasting sources can also be employed. Global expected inflation estimates are constructed by backing out country-specific inflation rates from the ratio of nominal vs. real exchange rate period to period change. Then, it may be assumed that each country's expected inflation rate occurs in the same proportion as the ratio of actual inflation rates to U.S. inflation (CPI-based). However, other methodologies can be applied to derive this information. The GDP weighted average expected inflation rate for the basket of foreign currencies is derived by multiplying each period-wise proportionality coefficient by the corresponding period U.S. expected inflation. Finally, the global inflation rate is obtained as a GDP weighted average of U.S. vs. non-U.S. expected inflation rates. Gold prices are London pm Fix available monthly since 1971, quoted in each national currency: Euro, $USD, Yen, Australian $, and Pound Sterling. For each national currency, the GDP weights are 1980 real GDP weights applied from QIII 1979 until QIV 1989. The 1997 real GDP weights are applied from QI 1990 until QIII 2002. The GDP weights data is from the CIA's Handbook of International Economic Statistics. Real GDP weights are used instead of nominal GDP weights in the implementation of our pricing formulas, since they do not widely differ from nominal GDP weights for these two years. U.S. historical top marginal rates from the IRS website http://www.irs.gov/tax-stats/index.html, serve as proxies for the global corporate tax rates.

Equation (23) gives a comprehensive account of the key factors that affect domestic real gold prices: domestic GDP/capita growth, domestic inflation, exchange rates and relative GDP weight. The second ratio on the right hand side (RHS) of Equation (23) may in general be close to one. This is true, for example, when the home country GDP weight is large. This is also true when PPP is close to being satisfied. In the case where PPP is fully satisfied at any point in time, then the second ratio on the RHS does equal one, and Equation (23) becomes:

$$\tilde{P}_t = \frac{C \times RY_{t+1}}{(1 + \pi_{t+1})} \quad (24)$$

The present invention predicts that the decrease in proportion of gold total value as compared to world wealth, which is explained by the RYM in the fact that relative to financial assets, the long-term nominal value of gold must increase at the inflation rate, whereas the value of other assets rise with inflation plus real productivity. Thus, the proportion of investable wealth declines at an annual rate equal to real per-share earnings growth or GDP/capita growth.

Figure 6:
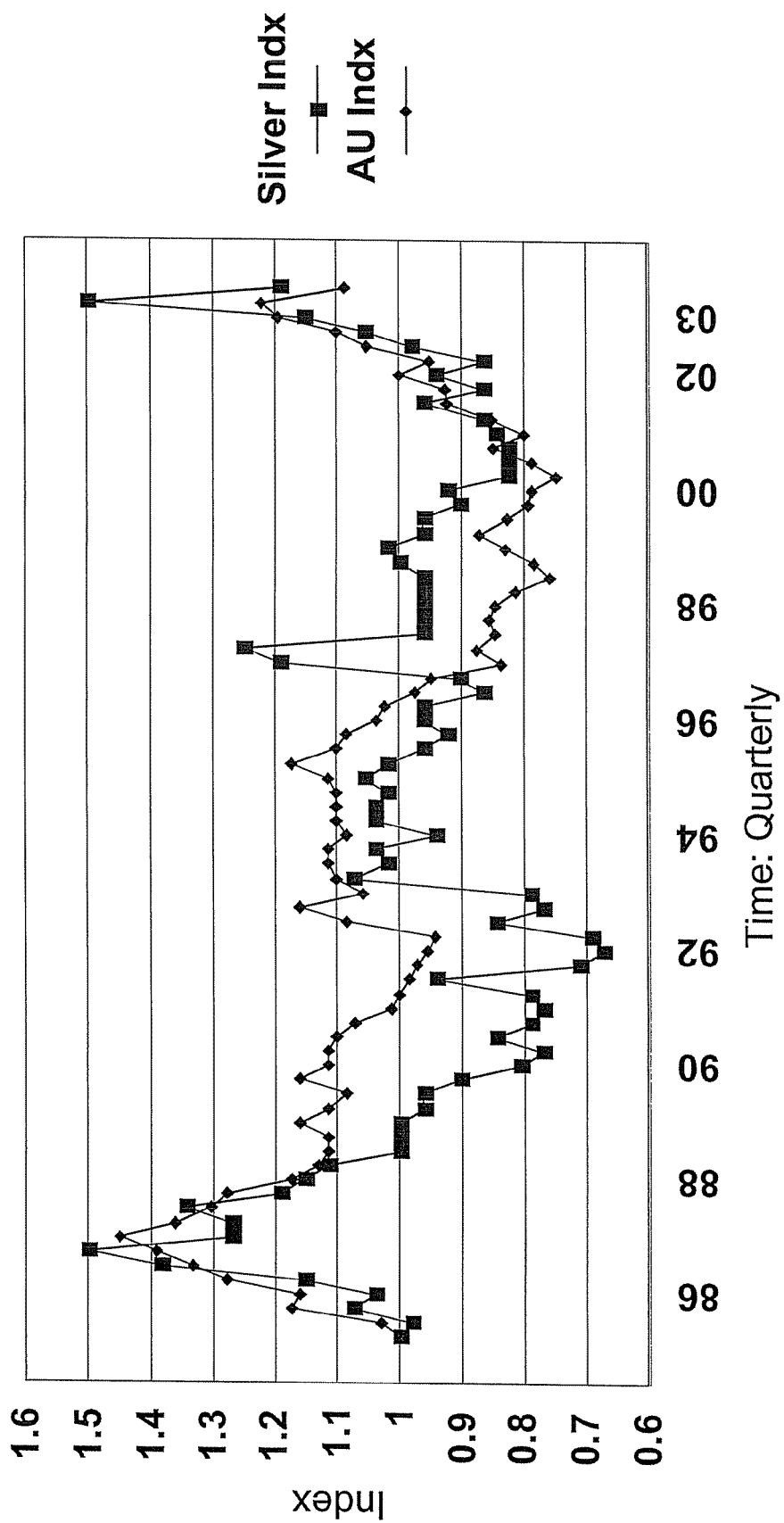
FIG. 6 graphically depicts an indexed nominal gold and silver price relationship over the period 1986-2003 using quarterly observations.

Since the gold/silver price relationship is quite stable, the RYM holds for silver valuation as well. FIG. 6 graphically depicts an indexed nominal gold and silver price relationship over the period 1986-2003.

The RYM implies that real estate prices are also a function of RY. It can be shown that units of real estate per-capita are essentially constant; much like precious metal stock outstanding; but can be viewed as generating or able to generate an earnings stream like a financial asset. The price of real estate moves inversely to the RY, like a stock. While lower RY is associated with lower interest rates and thus greater real estate affordability due to lower mortgage costs on the tax-adjusted interest portion, and constitutes, ceteris-paribus, an increase in demand for real estate, and thus an increase in willingness to pay.

3. Required Yield Method and Fixed Income (Bond) Yield

Figure 7:
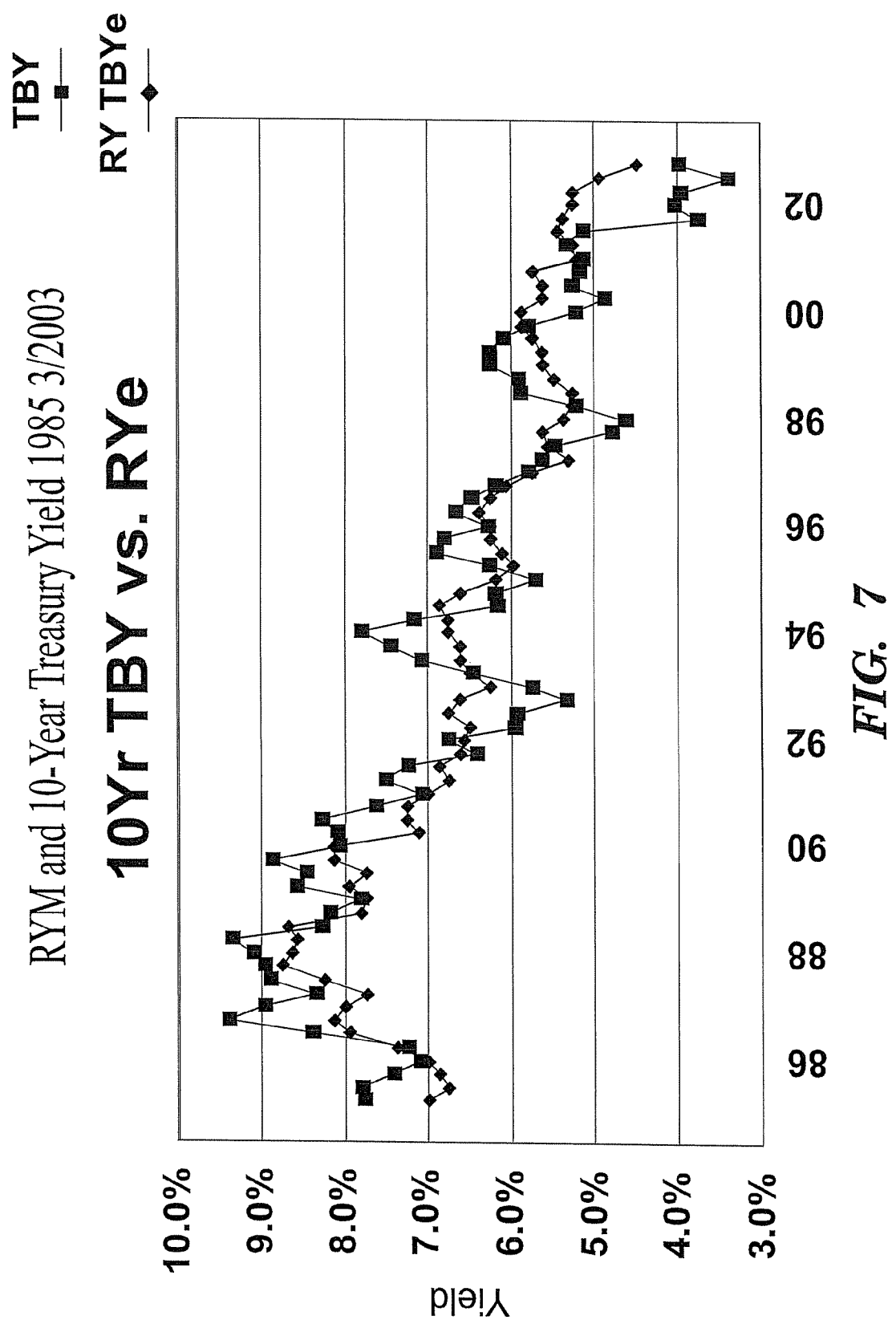
FIG. 7 graphically depicts the RYM-predicted and 10-year Treasury yield over the period 1985-2003, in accordance with embodiments of the present invention.

Real total bond yield cannot compound faster than GDP/capita growth; or it becomes impossibly decoupled from the economy. Thus the standard risk-free 10-year Treasury yield should comprise that nominal return which after taxes and expected inflation yields the long-term, per-capita productivity rate. At-risk bond yields, in addition, include an expected default premium plus administrative costs of the debt issue (declining over history due to automation). Note that at-risk bonds cannot yield more than treasuries in real, after-tax terms in the aggregate, and after defaults net of recoveries and related costs, else this return too would impossibly decouple from real GDP. FIG. 7 graphically depicts the RYM and 10-year Treasury yield over the period 1985-2003, in accordance with embodiments of the present invention. The 18-year quarterly depiction of the nominal 10-year Treasury yield, as compared to the RYM-predicted yield, takes into account expected one year forward inflation and averaged capital gain and income taxes (at the highest marginal rate then in effect). The result for the period of 72 observations is an absolute average variance from actual yield of less than 6.5%.

4. Additional Embodiments and Applications

The embodiments and applications described in the following subsections of this Additional Embodiments and Applications section, as well as in Sections 1-3 described supra, may be implemented without computerization, or with computerization by software code that is executed on a computer system such as the computer system 90 described infra in conjunction with FIG. 12. The computerization may be implemented with or without user interaction.

Integrated Asset Valuation and Investment Management System Under RYM

Figure 8:
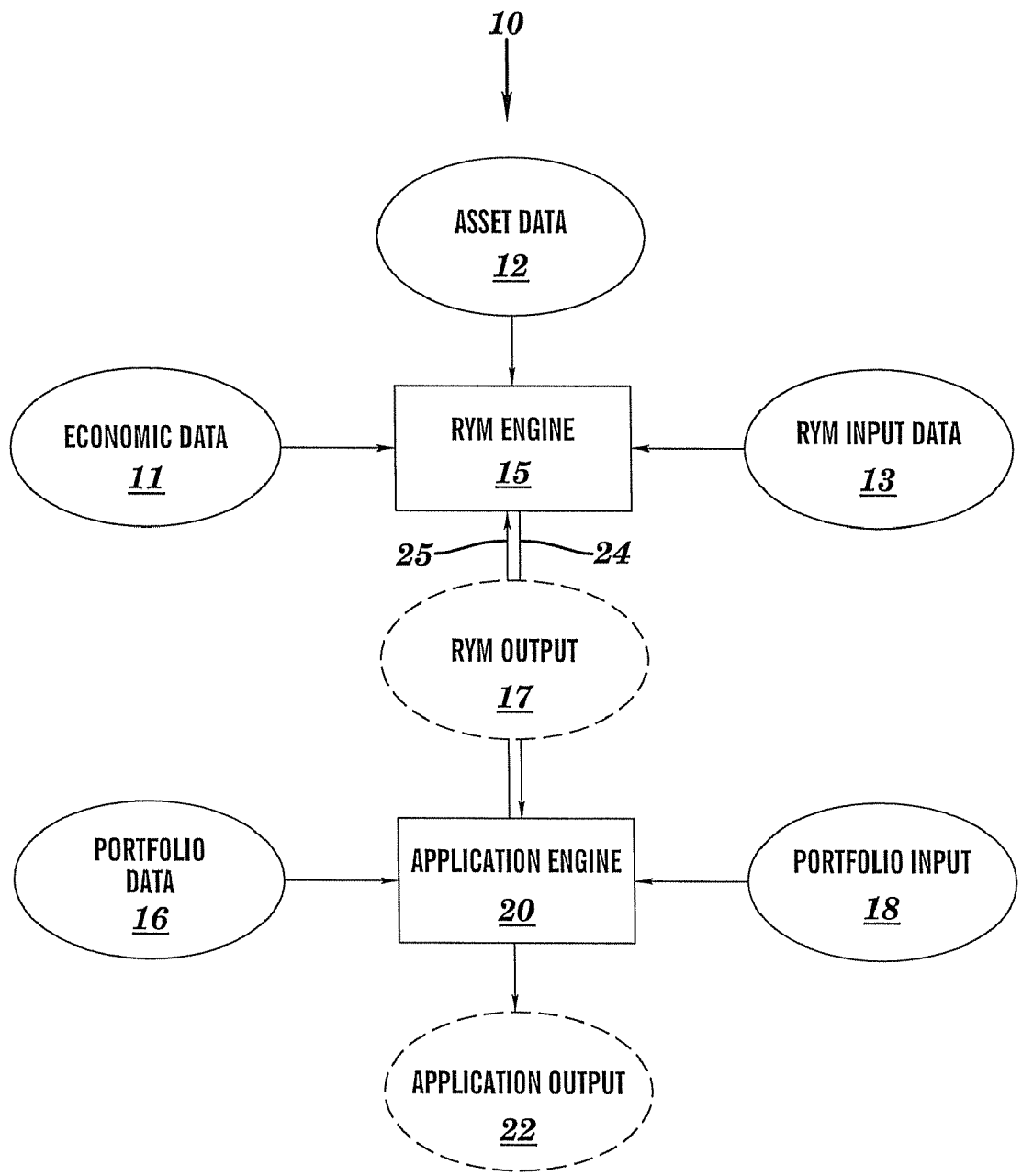
FIG. 8 is a block diagram providing an overview of an integrated asset analysis system, in accordance with embodiments of the present invention.

FIG. 8 is a block diagram providing an overview of an asset analysis system 10, in accordance with embodiments of the present invention. The system 10 comprises economic data 11, asset data 12, RYM input data 13, and a RYM engine 15. The economic data 11, asset data 12, and RYM input data 13 serve as input to the RYM engine 15. The economic data 11 includes data (e.g., GDP/capita growth, tax rates, inflation rate estimates/expectation, earnings estimates/expectation, interest rates, etc.) pertinent to an economy utilized by the RYM. The economic data 11 may be stored in a database or supplied as input directly to the RYM engine 15. The economic data 11 may include historic economic data as well as published economic expectations and may be obtained from any available source (e.g., any source(s) identified supra). The asset data 12 includes data (e.g., asset price, bid-ask and/or earnings data, payout ratio data, etc.) pertinent to asset classes (e.g., stocks, gold, bonds, etc.) being analyzed by the RYM and may be client specific. The asset data 12 may be stored in a database or supplied as input directly to the RYM engine 15. The asset data 12 may include real-time data as well as published financial expectations and may be obtained from any available source (e.g., any source(s) identified supra). The RYM input data 13 (if present) may include data specifying what functionality the RYM engine 15 is to perform (e.g., asset valuation for an equity index, asset valuation for gold, yield to maturity for a bond, etc.).

The RYM engine 15 processes the economic data 11 and asset data 12 in accordance with the RYM input data 13 (if present), by utilizing the RYM as described supra to compute the RYM output 17. The RYM engine 15 may compute and output any parameter by any mathematical formula, algorithm, or technique described supra in Sections 1-3 or as described and indicated infra. For example, the RYM engine 15 may use the RYM to calculate, inter alia, one or more asset characteristics (e.g., asset price when the asset is an index equity, asset yield to maturity when the asset is a bond, currency exchange rate when the asset is a currency, etc.), utilizing the economic data 11 or utilizing both the economic data 11 and the asset data 12, as will be described infra. Whether an asset parameter is comprised by asset data 12 or is instead an asset characteristic computed by the RYM engine 15 may depend on implementation considerations. For example in consideration of the asset parameters $e_{t+1}$ and $P_t$ of Equation (14), one may supply $e_{t+1}$ as an asset input and have the RYM engine 15 compute $P_t$ via Equation (14), or alternatively one may provide $P_t$ as asset input and have the RYM engine 15 compute $e_{t+1}$ via Equation (14). The RYM engine 15 may be implemented by software code that is executed on a computer system such as the computer system 90 described infra in conjunction with FIG. 12. The calculations and analyses performed by the RYM engine 15 may be organized into software modules or may exist in a single computer program.

The system 10 may further comprise portfolio data 16 and portfolio input 18, and an application engine 20. The portfolio data 16, portfolio input 18, and RYM output 17 (via path 24), serve as input to the application engine 20. The RYM output 17 may be transferred from the RYM engine 15 to a tangible medium such as, inter alia, an information viewing medium such as a computer screen, a printing device, a data storage medium, a database comprised by a data storage medium, etc. If transferred to a an information viewing medium or printing device, the RYM output 17 may be printed as a numerical value (e.g., $P_t$) or may be plotted graphically (e.g., $P_t$ vs. $[g_y + \pi_{t+1}]$).

The portfolio data 16 include data (e.g., dollars invested in various assets and asset classes) pertinent to a client portfolio being managed in conjunction with the RYM. The portfolio input 18 may include data specifying what functionality the application engine 20 is to perform. The application engine 20 processes the portfolio data 16 and the RYM output 17 in accordance with the portfolio input 18 (if present) to perform at least one function (e.g., asset valuation, asset management, trading and support, portfolio management, portfolio analysis, portfolio construction, asset allocation, risk assessment and/or management, recommendation for investment and/or trading, client account support and management, hedging, formulation of investment objectives, etc.) and generate application output 22. The application output 22 may include, inter alia, reports relating to the least one function performed by the application engine 20. Note that the at least one function may comprise at least one service performed by a service provider for a customer of the service provider.

The application engine 20 may input a request via path 25 to the RYM engine 15 to have the RYM engine 15 perform a requested calculation. The application engine 20 may be computer software code that is executed on a computer system such as the computer system 90 described infra in conjunction with FIG. 12. The functions implemented by application engine 20 may each be implemented within a distinct software module, or alternatively groups of functions implemented by the application engine 20 may each be implemented within a distinct software module, or alternatively all functions implemented by the application engine 20 may be implemented within a single software module or a single computer program.

The RYM engine 15 and the application engine 20 may be integrated within a single computer program or may separately exist within multiple computer programs. Any mathematical formula, algorithm, or technique described supra in Sections 1-3 (or as described and indicated infra) may be utilized by the RYM engine 15, by the application engine 20, or by both of the RYM engine 15 and the application engine 20.

Equity Valuation

RY may be used to value and trade equity indices, mutual funds, exchange-traded funds and like asset pools or individual stocks. The valuation of an equity index, such as the Standard and Poors (S&P) 500, may be conducted using RY as follows by utilizing Equation (14) and extracting the price $P_t$ of the equity index via $$P_t = E(e_{t+1}) \times \frac{1 - \tau_{dt+1}b_{t+1} - \tau_{ct+1}(1 - b_{t+1})}{\text{Max}(g_y + \pi_{t+1}; (1 - \tau_{it+1})R_{bt+1})} \quad (25)$$

$P_t$ is an asset characteristic for the asset of an equity index. Equation (25) may be implemented by, inter alia, using actual first quarter 1996 economic data. For example, given an expected inflation estimate of 2.38%, an earnings per-share estimate of $42.52, an after-tax 10-year Treasury yield of 4.18% (in this case the after-tax real T-bond yield is less than our long-term productivity estimate of 2.07%), a dividend marginal tax rate of 28.9%, a capital gains tax rate of 29.19% and a dividend payout of 41.7%, the resulting P/E=15.94, and the estimated price $P_t$=677.75 from Equation (25). For comparison purposes, the actual figures for the S&P 500 were P/E=14.45, and an index value of 614.42. Equation (25) may be implemented by the RYM engine 15, by the applications 20, or by both.

The RYM stipulates that all assets are priced so as to yield a compounded RY. Thus, in the case of an individual stock where cash flows outpace GDP/capita growth, a discounted cash flow formula would apply using the RY as a discount rate. A traditional discounted cash flow (DCF) or net present value (NPV) valuation model discounts expected future cash flows to arrive at a discounted present value for an individual stock.

The discount rate often comprises a risk-free or Treasury rate plus an asset-specific risk premium; taking the form:

$$\text{NPV} = \Sigma \text{cashflow } 1/(1+\text{discount rate}) + \text{cashflow } 2/(1+ \text{discount rate})^2 \quad (26)$$

In the special case where a cash flow (x) grows at a constant compound rate equals to the RY; then the price (P) is given by P=x/RY.

The Equity Evaluation of the present subsection, including implementation of Equations (25)-(26), may be performed by the RYM engine 15, by the applications 20, or by both (see FIG. 8).

RYM and Fixed Income Yield Determination

In one embodiment, RY is applied to the determination or evaluation of a fixed income financial instrument yield to maturity (e.g., a bond). Treasury yields (10-year T-bond), is determined by the following relationship:

$$R_{bt+1} = \frac{g_y + \pi_{t+1}}{(1 - \tau_{bt+1})} \quad (27)$$

where $R_{bt+1}$ (yield to maturity) is an asset characteristic for the asset of a fixed income financial instrument, and $\tau_{bt+1}$ represents a marginal tax rate on interest income or blended tax rate of interest and capital gains obtainable for example from the IRS website. The yield on any corporate or municipal bond $\text{YTM}_{t+1}$ may in turn be compared to a "risk-free" Treasury 10-year term bond as follows:

$$\text{YTM}_{t+1} = R_{bt+1} + Z_{t+1} \quad (28)$$

where $Z_{t+1}$ stands for the default premium attributable to the rating of the bond (the default premium can be estimated using default probability transition matrices available from Moody's).

The RYM and Fixed Income Yield Determination of the present subsection, including implementation of Equations (27)-(28), may be performed by the RYM engine 15, by the applications 20, or by both (see FIG. 8).

Foreign Exchange Determination

The Required Yield model of the present invention is applicable to exchange rate determination through Required Yield Parity: the condition that specifies that exchange rates between two countries must change in inverse proportion to changes in their expected RYs. RY Parity is directionally consistent with Purchasing Power Parity theory that says that exchange rates in the long term must inversely reflect relative national general level of prices.

An embodiment of the present invention as applied to exchange rate valuation, trading or other investment strategy may comprise the elements of: (1) country-specific economic expectations at successive points in time, (2) the RY parity condition; and (3) the calculated exchange rate.

Such an application involves the steps: 1) inputing historic and current foreign exchange quotes into an RY engine, 2) inputing historic and new national economic data and/or expectations, and 3) computation involving the RY parity formula given by Equation (22):

$$\frac{s^e_{t+1}}{s_t} = \frac{RY_{t+1}}{RY_{Xt+1}} \qquad (29)$$

$s_{t+1}^e$ is an asset characteristic for the asset of a currency of the domestic economy. Equation (15) may be used to calculate $RY_{t+1}$ (pertinent to country A) and $RY_{Xt+1}$ (pertinent to country B). That is $RY_{t+1}$ may be calculated as the sum of the GDP growth rate of country A and the expected inflation rate of county A at time t+1, whereas $RY_{Xt+1}$ may be calculated as the sum of the GDP growth rate of country B and the expected inflation rate of county B at time t+1.

For example, inflation expectations for time 0 for countries A and B are both 2% (both countries GDPs are identical), and expectations rise to 4% at time 1 for country B. Then relative required yield parity predicts that the $RY_{Xt+1}$ for country B in time 1 will become 1.5% real productivity+4% expected inflation=5.5% vs. an unchanged 3.5% for country A. RY parity predicts that the currency of country B will decline compared with that of country A according to the function: $RY_{t+1}/RY_{Xt+1}$=3.5%/5.5%=a decline to 63.6% of its time 0 value.

The Foreign Exchange Determination of the present subsection, including implementation of Equation (29), may be performed by the RYM engine 15, by the applications 20, or both (see FIG. 8). RY parity may be further modified by the RY-driven price effects on domestic assets. Countries with differing asset compositions comprising equities, bonds, real estate and other assets, experience RY Parity-related relative exchange rate effects modified by the proportional differences in their respective asset compositions and the RY-driven price effects on those assets.

RYM and Gold Valuation

The RYM may be used to value a precious metal such gold or silver and to predict price changes given expectations about changes in inflation and foreign exchange rate when relative national RYs are not substantially changing. According to the RYM, the real price of a precious metal will move directly with the domestic RY and inversely with the foreign exchange rate, when the latter is unassociated with changes in relative national RYs. The precious metal price $\tilde{P}_t$ is given by Equation (23):

$$\tilde{P}_t = \frac{C \times RY_{t+1}}{(1+\pi_{t+1})} \times \frac{\theta_t + (1-\theta_t) \times \tilde{s}_t / \tilde{s}^e_{t+1}}{\theta_t + (1-\theta_t) \times 1/\tilde{s}_t} \qquad (30)$$

$\tilde{P}_t$ is an asset characteristic for the asset of a precious metal (e.g., gold). Equation (30) gives a comprehensive account of the key factors that affect domestic real gold prices: domestic GDP/capita growth, domestic inflation, exchange rates and relative GDP weight. For example, assume that the foreign real exchange remains unchanged, but that the domestic RY goes from 4% to 6%, with a corresponding increase in expected inflation from 2.5% to 4.5%. In that case, when applying the empirical value for the constant C=$8929 (or similarly empirically derived constant), the real price of gold rises from $348.4 to $512.7 using Equation (30).

Equation (30) may be reorganized to permit $\tilde{P}_t$ to be expressed and calculated alternatively via Equation (30A) or Equation (30B):

$$\tilde{P}_t = CF_t \qquad (30A)$$

$$\tilde{P}_t = \tilde{P}_{t-1} F_t / F_{t-1}, \text{where} \qquad (30B)$$

$$F_t = \frac{RY_{t+1}}{(1+\pi_{t+1})} \times \frac{\theta_t + (1-\theta_t) \times \tilde{s}_t / \tilde{s}^e_{t+1}}{\theta_t + (1-\theta_t) \times 1/\tilde{s}_t} \qquad (30C)$$

Equation (30A) is the same equation as Equation (30). The calculation of $\tilde{P}_t$ in Equation (30B) is independent of the constant C.

The RYM and Gold Valuation of the present subsection, including implementation of Equation (30), may be performed by the RYM engine 15, by the applications 20, or by both (see FIG. 8).

Real Estate Valuation According to the RYM

The present invention incorporates another RY based asset valuation method similar to Equity Valuation embodiments and RYM and Fixed Income Yield Determination embodiments described supra. A modification of the RY based asset valuation method relating to equity and bond valuations, may be adapted to the valuation of a net income or cash flow stream for real estate assets and computed, based on a formula derived and translated from Equation (14) where on the left hand side expected earnings ($e_{t+1}$) are captured for example by expected rental income (on a Real Estate Investment Trust (REIT) index for example) and the price ($P_t$) is the real estate price, (or its real, inflation-adjusted value) or index value which is calculated according to Equation (14) in which the average marginal tax rate ($\tau_{dt+1}$) for dividend income over the period from time t to time t+1 is replaced by the average marginal property tax rate ($\tau_{pt+1}$) over the period from time t to time t+1. $P_t$ for the real estate price or index value is an asset characteristic for the asset of real estate or a derivative thereof (e.g., a real estate index).

A Wall Street Journal article of Jul. 10, 2002, page B8 notes home P-E ratios for 1989, 1995 and 2001 from the National Association of Realtors, for median home prices divided by average effective rents. If further adjustments are made to rents to include taxes, maintenance, after-tax mortgage and depreciation effects, the home P-E to adjusted rents is related to a historic or expected RY.

The Real Estate Valuation According to the RYM of the present subsection may be performed by the RYM engine 15, by the applications 20, or by both (see FIG. 8).

Derivative Pricing: Using Call Option as an Example

An embodiment of the present invention shows the implications of RY valuation for derivatives via the use of a traditional Black-Scholes call/put-option pricing model as an example. Black-Scholes assumes that the stock price follows a random walk in continuous time; and typically uses a historic time-sample of price/return volatility. Further, Black-Scholes assumes that the distribution of possible stock prices at the end of any finite interval is lognormal; that the variance rate of return on the stock is constant. RY Theory teaches that an option or other derivative will be a function of the underlying asset price, which can be expected to vary according to the RY. Furthermore, RY Theory teaches that the historic variability of an asset price is not a random walk but a function of the expected and actual earnings of that asset and the macroeconomic variables that determine the required yield in an economy. Thus, it is possible to decompose asset price variability into components of tax rate change, change in expected earnings and changes in expected inflation and excess real risk-free yield. Additionally, RY Theory derives the risk-free yield from macroeconomic variables. Hence, by coupling the RY with derivative pricing models, expected changes in underlying assets based upon changes in economic variable expectations, can be incorporated into derivatives pricing models. The present invention model may employ professional forecasts for actual macroeconomic factors, and specific earnings forecasts from sources such as First Call. Values for a call price c or put price p are given by:

$$c = s\Phi(d_1) - xe^{-rt}\Phi(d_2) \quad (31)$$

$$p = xe^{-rt}\Phi(-d_2) - s\Phi(-d_1) \quad (32)$$

where:

$$d_1 = \frac{\log(s/x) + (r + \sigma^2/2)t}{\sigma\sqrt{t}} \quad (33)$$

$$d_2 = d_1 - \sigma\sqrt{t} \quad (34)$$

In Equation (33), log denotes the natural logarithm, and:
s=the price of the underlying stock
x=the strike price
r=the continuously compounded risk-free rate (e.g. the 3 month T-bill rate)
t=the time in years until the expiration of the option
σ=the implied volatility for the underlying stock
Φ=the standard normal cumulative distribution function.

In the above Black-Scholes example, which is easily extrapolated to all other derivatives (e.g., look-back options) in accordance with the present invention, the RY directly affects the values of the inputs of the Black-Scholes formula such as the current stock price s the stock return volatility σ, the risk-free rate r, and the nature of stock returns statistical distribution Φ. For instance, a sudden change in inflation expectations will affect the current price of stocks via the Required Yield and thus the RY-predicted new stock price can become the new input for the current price. Along the same lines, the risk free rate would be affected by a change in inflation expectations as predicted by the RYM, and the RY-predicted new risk-free rate can now constitute a new input. As described by the RYM, stock return volatility is affected by earnings volatility and inflation expectations volatility. Thus, a shock to the general level of prices such as an oil shock may affect the volatility of inflation expectations and in turn the volatility of stock returns. Through this causality chain, a new input for the stock return volatility may be incorporated in the Black-Scholes formula as predicted by the RYM. Finally, higher moments of the stock returns distribution may be affected (such as skewness) by the same causality described above which in turns may modify the normality assumption of Black-Scholes.

More specifically, RY affects the general equity market P/E and thus the prices of all stocks, given no change in earnings expectations. Thus a change in the expected RY directly affects the underlying price of an asset on which a derivative is based.

Thus, changing expectations of factors that affect RY will affect the Black-Scholes pricing outcome accordingly The scope of the present invention applies generally to derivative pricing models of which the Black-Scholes model is a specific example.

The Derivative Pricing of the present subsection may be performed by the RYM engine 15, by the applications 20, or by both (see FIG. 8).

Portfolio Analysis, Recommendation and Construction Modules

Figure 9:
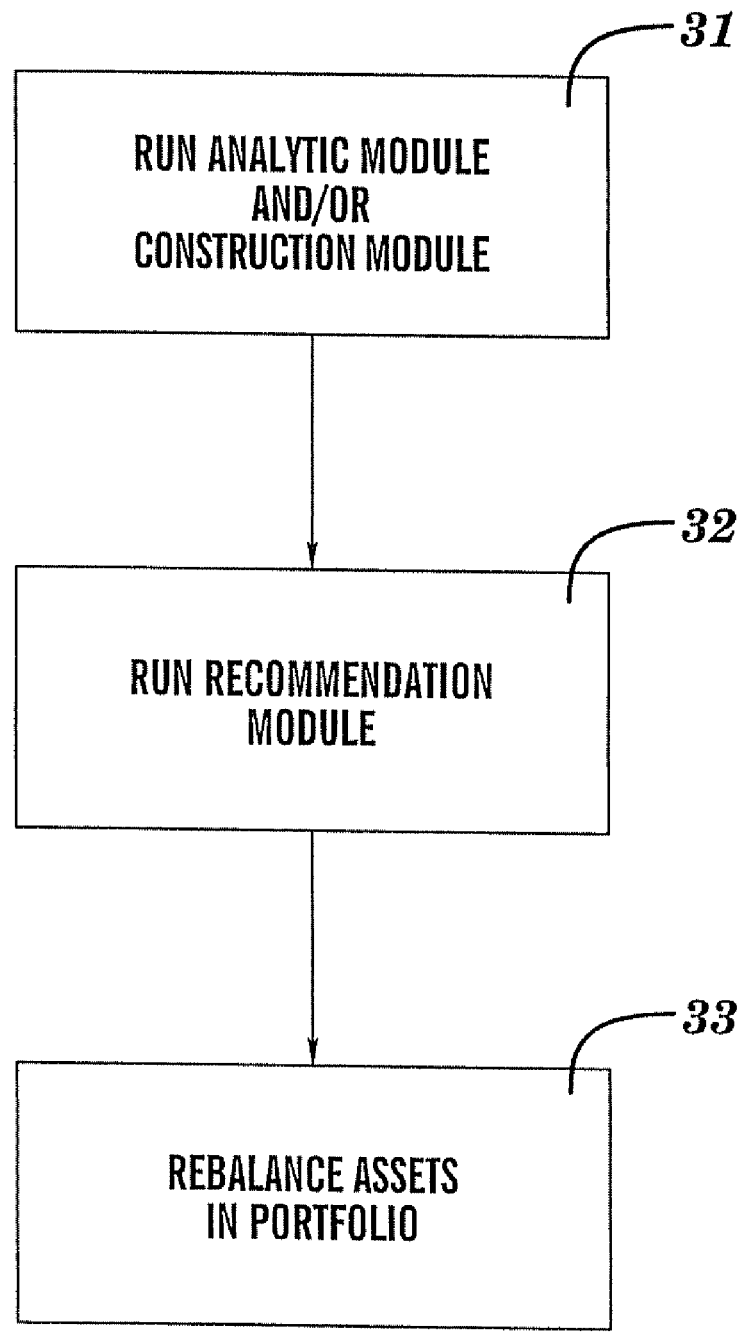
FIG. 9 is a flow chart showing how the RYM may be utilized to analyze a portfolio and rebalance assets therein, in accordance with embodiments of the present invention; based on said portfolio analysis.

One embodiment of the present invention may include at least three manifestations: an analytic module, a construction module, and a recommendation module. Accordingly, FIG. 9 is a flow chart showing how the analytic module, construction module, and recommendation module may be utilized in accordance with the RYM to analyze a portfolio and rebalance assets therein based on said portfolio analysis, in accordance with embodiments of the present invention. The flow chart of FIG. 9 comprises steps 31-33.

Step 31 runs the analytic module and/or construction module. Using the RYM, the analytic module assesses a portfolio's assets with respect to valuation impact under various actual, historic, expected, real-time or hypothetical scenarios that may affect the RY. For example, a scenario for an increase in the RY may be run against a portfolio comprised of gold mining stocks, stocks, and bonds in one or more countries. Using the RYM, the portfolio construction module may operate upon a target return, risk, or economic scenario, yielding a series of possible asset class mixes consistent with return goals, economic expectations and risk.

Using the RYM, step 32 runs the recommendation module using the results from running the analytic module and/or construction module in step 31, as applied to an actual portfolio or one to be constructed given actual asset holdings, expected economic scenarios or desired return targets. Running the recommendations module results in suggested asset changes (e.g., sales or purchases in certain proportions of specific securities and combinations of securities) according to provided objectives or scenarios.

Based on the suggested asset changes generated by the recommendation module in step 32, in conjunction with investor industry, return, hedge and other preferences, step 33 may rebalance the assets in the portfolio to accomplish desired portfolio goals.

The Portfolio Analysis, Recommendation and Construction Modules of the present subsection may be performed in the applications 20 (see FIG. 8).

Risk Assessment and Management

Risk is traditionally defined as a probability of an adverse asset value change. In a portfolio context, aggregate risk exposure may be determined by summing the discrete risks of each asset in the portfolio in dollar or percent to total portfolio terms, with a probability assignment. Such risk assessment is often based on historic asset correlations to each other and economic conditions and factors such as interest rates; or on Monte Carlo simulations. For example, a Value at Risk (VAR, Riskmetrics®) analysis can also be undertaken by breaking-up the asset risk into its RYM based components.

The RYM enables a new means of asset and portfolio risk assessment based on the RY-driven expected value change in individual assets and asset classes; replacing or supplementing statistical measures of asset price variability or correlation as noted. For example, in a situation where the RYM predicts that a RY is expected to, or stress-tested to assess the effect of a change of yield from 4% to 4.5% for a simple portfolio comprised of 50% stocks mirroring the S&P 500 and 50% bonds mirroring 10-year Treasuries with 10 year term to maturity: the value change may be quantified as: [EPSt+1/EPSt (to account for earnings growth)*$RY_t/RY_{t+1}$]*[50% of portfolio]+the change in bond price that may occur: [50% of portfolio]*Bond Price change due to yield change (a price decrease of 3.96%). Such a decline may be quantified in the form of possible dollar loss given the amount of assets exposed and the percentage of expected decline.

Figure 10:
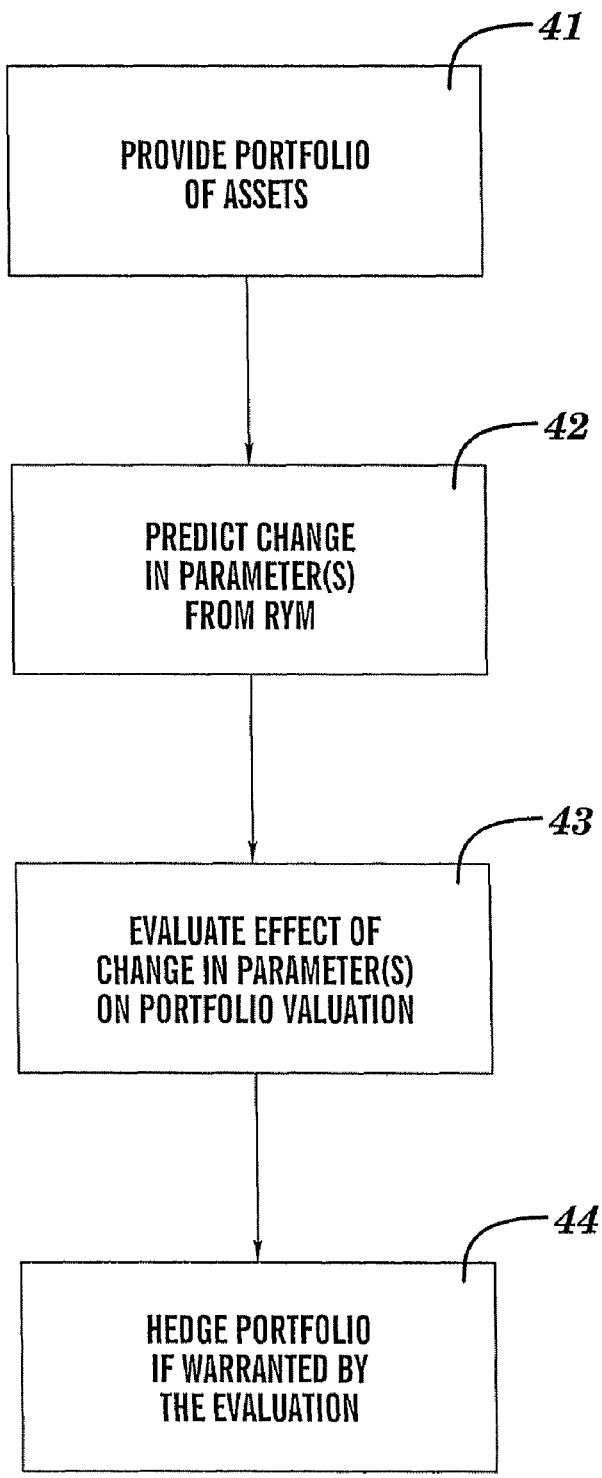
FIG. 10 is a flow chart showing how the RYM may be utilized to perform risk assessment and management, in accordance with embodiments of the present invention.

Accordingly, FIG. 10 is a flow chart in which steps 41-44 show how the RYM may be utilized to perform risk assessment and management, in accordance with embodiments of the present invention. In step 41, a portfolio of assets is provided. Step 42 predicts change in at least one asset characteristic relating to the portfolio assets, said predicted change being derived from the RYM. In the preceding example, the parameter of bond yield was predicted from the RYM to change from 4% to 4.5% for the portfolio. Step 43 evaluates effects of said predicted change to the portfolio valuation effects. In the preceding example, the portfolio valuation was predicted to decline due to the predicted bond yield increase. If the evaluation of step 43 indicates an unacceptable risk, it may be desirable to hedge the portfolio in step 44, as described in the next subsection entitled "Hedging".

Another aspect of risk assessment relates to calculating the volatility of any asset characteristic that is within the framework of the RYM. The volatility of the asset characteristic may as expressed as a standard deviation (or as another measure of dispersion) of the asset characteristic. For example, the standard deviation of $P_t$ (or of log $P_t$) may be determined from Equation (25), the standard deviation of $\tilde{P}_t$ (or of log $\tilde{P}_t$) may be determined from Equation (30A) or (30B), the standard deviation of $s_{t+1}^e$ (or of log $s_{t+1}^e$) may be determined from Equation (29), the standard deviation of $R_{bt+1}$ (or of log $R_{bt+1}$) may be determined from Equation (25), etc.

The Risk Assessment and Management of the present subsection may be performed in the applications 20 (see FIG. 8).

Hedging

Based on the degree to which a current market value departs from the value computed according to the present invention, a risk assessment can be provided of the likelihood of a contrary market movement (see preceding subsection entitled "Risk Assessment and Management"). This risk assessment may be used to quantify the type and amount of hedging instruments to employ for any given portfolio or scenario. Similarly, a future market value predicted by the RYM based upon user inputs of economic variables or market consensus expectations, may enable a hedge of a current asset position. Derivatives may be employed in hedging, as discussed above, or asset classes with expected counter-balancing price functions may be added to a portfolio.

For example, a stock index expected revaluation (e.g., in accordance with the methodology of the Integrated Asset Valuation and Investment Management System under RYM subsection described supra) of a 10% price decline may be hedged by purchasing put options with an expected equal gain in value to the expected loss in the aggregate S&P 500 portfolio value. The RYM enables precise valuation of assets under changing possible RY conditions, thus enabling offsetting hedging strategies.

Accordingly, the hedging step 44 of FIG. 9 may be performed if warranted by the evaluated effects of parameter change(s) in step 43 of FIG. 9.

The Hedging of the present subsection may be performed in the applications 20 (see FIG. 8).

Use of RYM in Conjunction with Technical Analysis and/or Sentiment Analysis

Technical analysis may be defined as the use of visual patterns or the mathematical or digital depictions of such patterns that are associated with subsequent or contemporaneous price and/or volume movements of assets. All known technical indicators may be utilized (e.g., moving averages, momentum indicators, oscillators, relative strength index, price patterns, volume accumulation, etc.). Sentiment relates to investor sentiment (i.e., bullish, bearish, or neutral). All known sentiment indicators may be utilized (e.g., put/call ratio, short sale ratio, etc.)

In one embodiment, RY valuation techniques based on the RYM may be utilized in conjunction with technical analysis and/or sentiment analysis to validate a conclusion and/or investment action. For example with respect to technical analysis, if successive new stock price highs are accompanied by increasing market breadth and increasing new highs vs. new lows, and the market is below the RY value, buying stocks may be considered desirable. For example with respect to sentiment analysis, if the put/sell ratio (which is a contrarian indicator) of an option is significantly higher than its normal range of values, then a highly bearish sentiment exists for the underlying stock which (from a contrarian point of view) may imply that a purchase of the underlying stock is desirable if the market is below the RY value.

Figure 11:
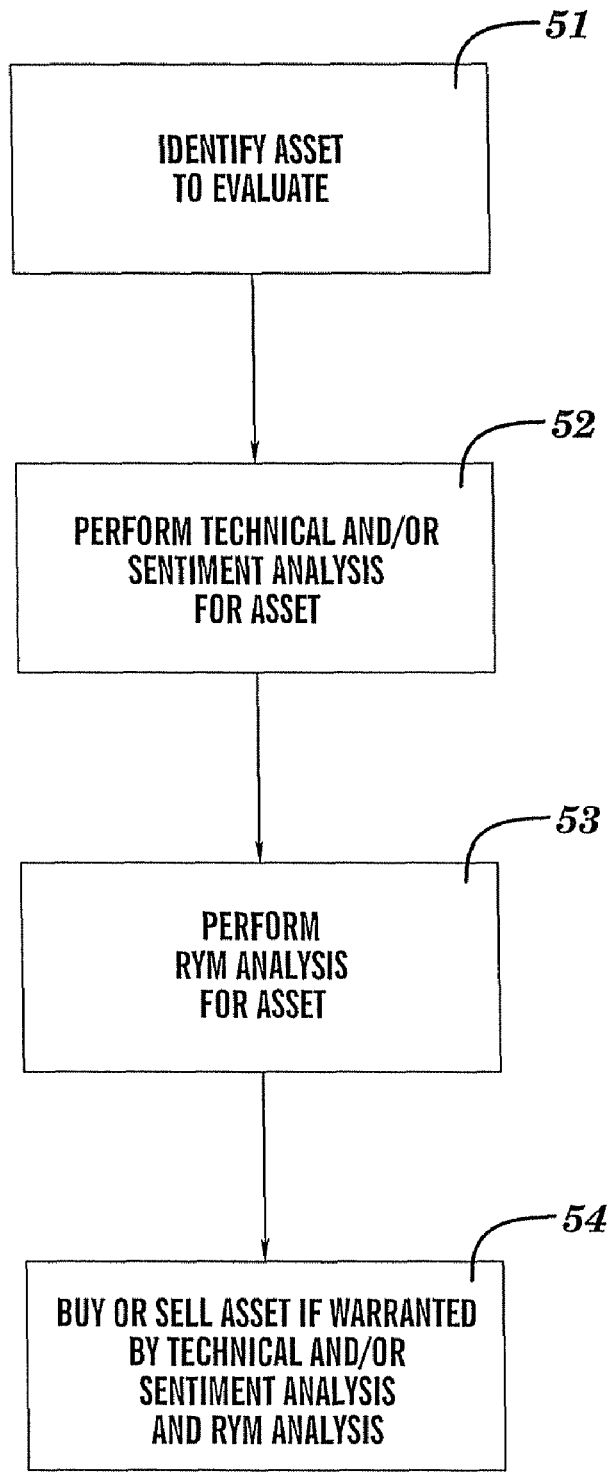
FIG. 11 is a flow chart showing how technical analysis and/or sentiment analysis may be utilized in conjunction with the RYM to determine whether to buy or sell an asset, in accordance with embodiments of the present invention.

Accordingly, FIG. 11 is a flow chart in which steps 51-54 show how technical analysis and/or sentiment analysis may be utilized in conjunction with the RYM to determine whether to buy or sell an asset, in accordance with embodiments of the present invention. In step 51 an asset to be evaluated is identified. Step 52 performs technical analysis and/or sentiment analysis for the asset to determine whether a market movement is predicted for the asset. Step 53 performs a RYM analysis to determine whether the asset is overvalued or undervalued. Step 54 reviews the results of steps 52 and 53 to determine whether the results of steps 52 and 53 are consistent with each other. If step 52 predicts that an upward movement in asset price may occur and if step 53 determines that the asset is undervalued, then steps 52 and 53 are consistent in that both steps 52 and 53 are suggesting that it may be desirable to buy the asset. If step 52 predicts that a downward movement in asset price may occur and if step 53 determines that the asset is overvalued, then steps 52 and 53 are consistent in that both steps 52 and 53 are suggesting that it may be desirable to sell the asset. Thus step 54 may result in buying or selling the asset based if warranted by the collective results of steps 52 and 53.

The use of the RYM in conjunction with Technical Analysis and/or Sentiment Analysis of the present subsection may be performed by the RYM engine 15, by the applications 20, or by both (see FIG. 8).

5. Computer System

Figure 12:
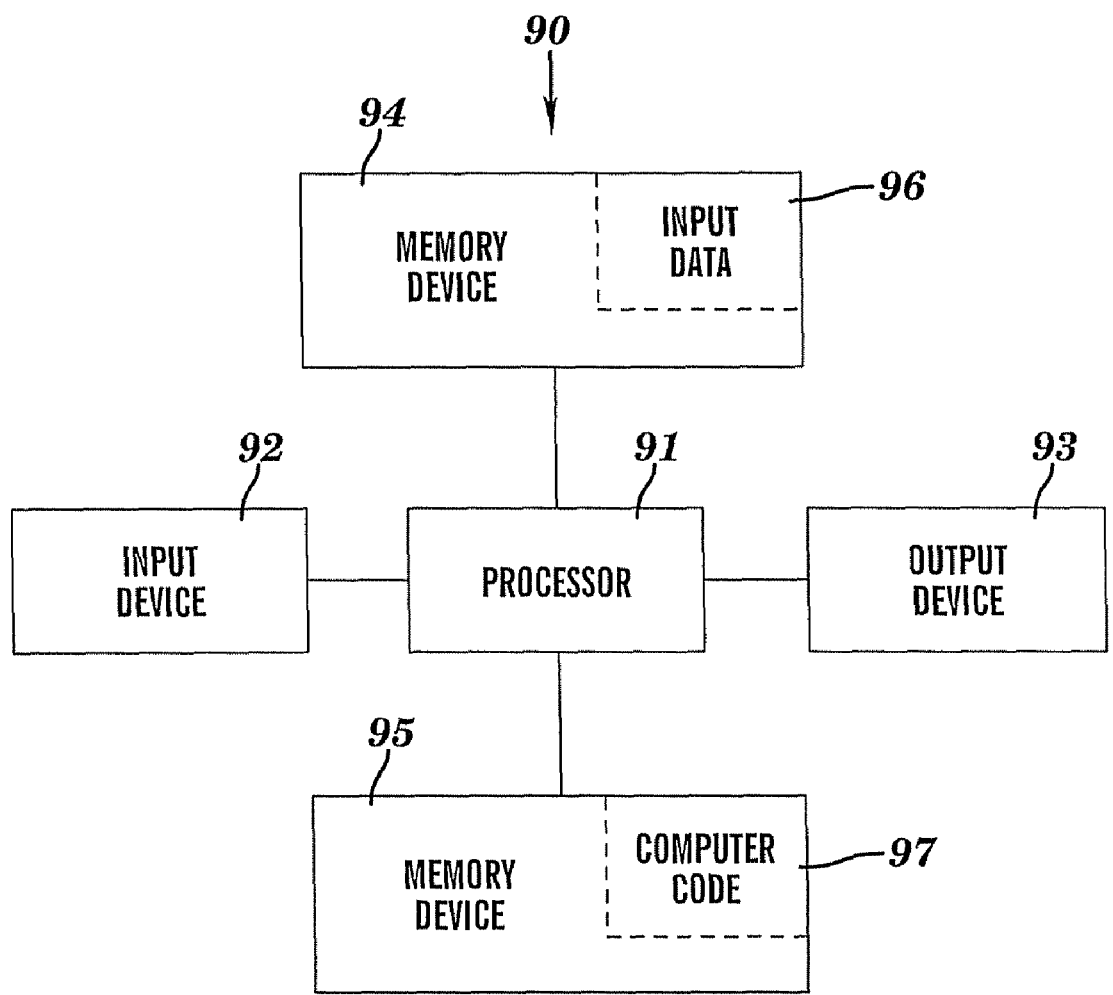
FIG. 12 illustrates a computer system used for performing an asset analysis according to the Required Yield Method (RYM), in accordance with embodiments of the present invention.

FIG. 12 illustrates a computer system 90 used for performing an asset analysis according to the Required Yield Method (RYM), in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for performing an asset analysis according to the Required Yield Method (RYM). The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 12) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

While FIG. 12 shows the computer system 90 as a particular configuration of hardware and software, any configuration of hardware and software, as would be known to a person of ordinary skill in the art, may be utilized for the purposes stated supra in conjunction with the particular computer system 90 of FIG. 12. For example, the memory devices 94 and 95 may be portions of a single memory device rather than separate memory devices.

6. Mathematical Symbols and Notation

Mathematical symbols and notation used herein, along with associated exemplary units for each symbol, are as follows, noting that all units indicated as "percent" can equivalently be expressed as a dimensionless fraction.

$b_j$=Payout ratio at time j (note: $d_j=b_j E_j$); payout ratio is the percentage of net earnings paid to equity owners (e.g., shareholders) as a dividend (percent).

$B_t$=Book value of market equity at time t (dollars).

C=constant denoting the real value of a perpetuity paying one ounce of gold every year forever, under stable inflation and real long-term productivity (real dollars).

$CR_{t+1,0}$=Cumulative compound rate up from time of entry into the investment until the time t+1; the second subscript (0) is the time of entry into purchase of the share (percentage).

$d_{j,0}$=Sum of all cash dividends received from time j−1 to time j by an initial investor at time 0 ($d_{j,0}$ becomes $d_j$ if time of entry into purchase of the share is known) (dollars).

$$D_{t+1,0} = \sum_{j=1}^{t+1} d_{j,0} = \text{Sum of all cash dividends}$$

(not reinvested) cumulated from time 0 up to time $t+1$ ($D_{t,0}$ becomes $D_t$ if time of entry into purchase of the share is known) (dollars)

$Def_{wt}$=Global price deflator at the time t.

$$e_{t+1} = \frac{E_{t+1}}{N_t^l} = \text{Expected earnings per-share,}$$

between time $t$ and time $t+1$ from the standpoint of time $t$ (dollars/share).

$$\frac{e_{t+1}}{P_t} = \text{Expected forward earnings yield from}$$

the standpoint of time $t$, over the period from time $t$ to time $t+1$, from the standpoint of time $t$ (dollars).

$E(g_{t+1})$=Expected rate of nominal capital gains per-share, between time t and t+1, from the standpoint of time t (percent/share).

$E(P_{wt+1})$=Expected global value of one ounce of gold at time t (dollars).

$E(\tilde{P}_{wt+1})$=Expected real global value of one ounce of gold at time t (real dollars).

$E_t$=Aggregate earnings between time t−1 and time t (dollars).

$$g_{ct+1} = (1 - \alpha b_{t+1})\frac{e_{t+1}}{P_t} = \text{Expected retained earnings,}$$

between time $t$ and time $t+1$, as a percent or fraction of the current stock price = sustainable growth rate of prices (percent).

$g_w$=Global GDP/capita long-term growth rate (percent/year).

$g_y$=Real GDP/capita growth rate (percent/year).

$l_{t+1}^t$=Liquidation of stock shares at time t+1: cashing-out due to retirement or investing in other asset classes (percent).

$n_{t+1}$=Growth rate of net new companies' shares at time t+1 (percent/year).

$N_{t+1}^t$=Number of shares outstanding at time t+1 held by the pool of investors in existence at time t.

$P_t$=Expected ex-dividend price per-share at time t (dollars).

$P_{t+1}$=Expected ex-dividend price per-share at time t+1 from the standpoint of time (dollars/share).

$P_{wt}$=Precious metal (e.g., gold) global price at time t (global composite currency unit).

$\tilde{P}_t$=Precious metal (e.g., gold) real domestic price at time t (real dollars).

$\tilde{P}_{wt}$=Precious metal (e.g., gold) real global price at time t (real global composite currency unit).

$\tilde{P}_{Xt}$=Rest of the world (i.e., global minus domestic) real precious metal price at time t (foreign bloc composite currency unit).

$R_{bt+1}$=Nominal yield to maturity of a fixed income financial instrument (e.g., T-bond) at time t+1 (percent/year).

$R_{min\ t+1}$=Minimum expected required yield over the period from time t to time t+1, from the standpoint of time t (percent/year).

$R_{t+1,0}$=Yearly compound rate between time t and time t+1 for an investor who purchased the share at time 0 ($R_{t+1,0}$ becomes $R_{t+1}$ if time of entry into purchase of the share is known) (percent/year).

ROE=Return on per-share equity in the long run (percent).

$RP_{t+1}$=Equity risk premium over the period from time t to time t+1 (percent).

$RY_{t+1}$=Expected Required Yield in the domestic country over the period from time t to t+1, from the standpoint of time t (percent/year).

$RY_{wt+1}=g_w+\pi_{wt+1}$=A global (world) stock index's Required Yield over the period from time t to time t+1 (percent).

$RY_{Xt+1}$=Expected Required yield in foreign bloc X over the period from time t to t+1, from the standpoint of time t (percent/year).

$s_t$=Domestic spot exchange rate (1 unit foreign basket equals $s_t$ domestic) at time t.

$s_{t+1}^e$=Expected time t+1 spot exchange rate, from the standpoint of time t (integer).

$\tilde{s}_t$=Real exchange rate at time t (1 real unit of foreign basket equals $\tilde{s}_t$ real unit of domestic basket).

$\tilde{s}_{t+1}^e$=Real expected time t+1 exchange rate, from the standpoint of time t.

$S_{t+1}$=Growth rate of net new investors' shares at time t+1 (percent/year).

$V_t$=Total market value at time t (dollars).

$V_{t+1}^t = N_{t+1}^t \times P_{t+1}$=Total market value at time t+1 held by investors existing at time t (dollars).

$YTM_{t+1}$=Yield to maturity from the period from time t to time t+1 on a corporate or municipal bond (percent/year).

$Z_{t+1}$=Default premium at time t+1 attributable to the rating of the corporate or municipal bond (percent).

$\alpha$=Fraction of cash dividends that are not reinvested over complete history (percent).

$\Delta_{t+1}$=the period from time t to time t+1 (year)

$\theta_t$=Relative nominal GDP weight of the domestic economy in global economy at time t.

$\pi$=Long-term inflation rate (percent/year).

$\pi_{t+1}$=Expected domestic inflation rate over the period from time t to time t+1, from the standpoint of time t (percent/year).

$\pi_{wt+1}$=Expected global inflation rate over the period from time t to time t+1, from the standpoint of time t (percent/year).

$\pi_{Xt+1}$=Rest of the world expected inflation rate at time t+1 from the standpoint of time t (percent).

$\tau_{bt+1}$=Marginal tax rate on interest income or blended tax rate of interest and capital gains from time t to time t+1 (percent).

$\tau_{ct+1}$=The top marginal capital gains tax rate over the period from time t to time t+1 (percent).

$\tau_{dt+1}$=Average marginal tax rate for dividend income over the period from time t to time t+1 (percent).

$\tau_{it+1}$=Average marginal tax rate for interest income over the period from time t to time t+1 (percent).

$\bar{\tau}_c$=Long-run value of $\bar{\tau}_{ct}$.

$\bar{\tau}_{ct}$=Weighted averages of past top marginal capital gains tax-rates (percent).

$\bar{\tau}_d$=Long-run value of $\bar{\tau}_{dt}$.

$\bar{\tau}_{dt}$=Weighted averages of past marginal dividend income tax-rates (percent).

$\tau_{pt+1}$=Average marginal property tax rate over the period from time t to time t+1 (percent)

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for performing an asset analysis, said method comprising:

a processor of a computer system computing at least one asset characteristic of each asset of at least one asset, each asset characteristic of said at least one asset characteristic of each asset being computed as a function of a gross domestic product (GDP) per capita growth rate ($g_{y1}$) for a first economy, said GDP per capita growth rate for the first economy being comprised by economic data, wherein the at least one asset is selected from the group consisting of at least one bond, at least one real estate asset, at least one precious metal, a currency of the first economy, and combinations thereof;

said processor transferring said computed at least one asset characteristic of each asset to a tangible medium selected from the group consisting of an information viewing medium, a printing device, a data storage medium, and combinations thereof; and executing at least one functional operation that utilizes one or more computed asset characteristics of the computed at least one asset characteristic of one or more assets of the at least one asset, wherein said executing at least one functional operation is selected from the group consisting of performing asset valuation, performing asset management, performing trading, performing portfolio management, performing portfolio analysis, performing portfolio construction, performing asset allocation, performing risk assessment and/or management, making a recommendation for investment and/or trading, managing a client account, performing hedging, said processor running an analytic module comprising assessing a portfolio having the at least one asset therein, said processor running a construction module comprising performing at least one risk and/or economic scenario and generating results therefrom, and combinations thereof.

2. The method of claim 1, wherein the first economy is selected from the group consisting of an economy of a country, a global economy, and an economic unit that comprises a plurality of countries.

3. The method of claim 1, wherein the economic data further comprises an expected inflation rate ($\pi_{t+1,1}$) for the first economy from time t to time t+1, each asset characteristic of said at least one asset characteristic of each asset being computed as a function of both the GDP per capita growth rate for the first economy and the expected inflation rate for the first economy in the economic data.

4. The method of claim 3, wherein the at least one asset characteristic of an asset of the at least one asset comprises a first asset characteristic that is not a function of asset data relating to the asset, wherein the asset of the at least one asset is a bond of the at least one bond.

5. The method of claim 4, wherein the first asset characteristic of the asset is an expected Required Yield ($RY_{t+1}$) from time t to time t+1, and wherein said computing comprises computing $RY_{t+1}$ according to $RY_{t+1}=g_{y1}+\pi_{t+1,1}$.

6. The method of claim 4, wherein the first asset characteristic of the asset is an expected nominal yield to maturity ($R_{bt+1}$) of the bond at time t+1, wherein said computing comprises computing $R_{bt+1}$ according to $R_{bt+1}=(g_{y1}+\pi_{t+1,1})/(1-\tau_{bt+1})$, and wherein $\tau_{bt+1}$ is an expected marginal tax rate on interest income or blended tax rate of interest and capital gains from time t to time t+1.

7. The method of claim 3, wherein the at least one asset characteristic of an asset of the at least one asset comprises a first asset characteristic that is a function of asset data relating to the asset, said asset data having been accessed prior to said computing.

8. The method of claim 7, wherein an asset of the at least one asset is a real estate asset of the at least one real estate asset.

9. The method of claim 8, wherein the first asset characteristic of the asset is an expected market price per share ($P_t$) of the asset in the first economy at time t, wherein the asset data comprises $E(e_{t+1})$ and $b_{t+1}$, wherein $E(e_{t+1})$ is an expected earnings per share of the asset from time t to time t+1, wherein $b_{t+1}$ is an expected payout ratio of the asset at time t+1, wherein the economic data further comprises $\tau_{pt+1}, \tau_{ct+1}$, and $\tau_{it+1}$, wherein $\tau_{pt+1}$ is an expected average marginal tax rate for property income from time t to time t+1, wherein $\tau_{ct+1}$ is an expected top marginal capital gains tax rate from time t to time t+1, wherein $\tau_{it+1}$ is an expected average marginal tax rate for interest income from time t to time t+1, and wherein said computing comprises computing $P_t$ according to $$P_t = E(e_{t+1}) \times \frac{1 - \tau_{pt+1}b_{t+1} - \tau_{ct+1}(1 - b_{t+1})}{\operatorname{Max}(g_y + \pi_{t+1}; (1 - \tau_{it+1})R_{bt+1})}.$$

10. The method of claim 7, wherein an asset of the at least one asset is a precious metal of the at least one precious metal.

11. The method of claim 10, wherein a foreign economy is a global economy of the whole world exclusive of the first economy, wherein the first asset characteristic of the asset is an expected real market price per share ($\tilde{P}_t$) of the asset in the first economy at time t, wherein the asset data comprises $\tilde{s}_t$ and $\tilde{s}_{t+1}^e$, wherein $\tilde{s}_t$ is a real currency exchange rate at time t such that one real unit of currency of the foreign economy equals $\tilde{s}_t$ real units of currency of the first economy, wherein $\tilde{s}_{t+1}^e$ is an expected real currency exchange rate at time t+1 such that one real unit of currency of the foreign economy equals $\tilde{s}_t$ real units of currency of the first economy, wherein $RY_{t+1}$ is defined such that $RY_{t+1} = g_{y1} + \pi_{t+1,1}$, wherein the economic data further comprises $\theta_t$, wherein $\theta_t$ is a relative nominal GDP weight of the first economy in the global economy, wherein C is a constant representing a real value of a perpetuity paying one ounce of gold every year forever under stable inflation and real long-term productivity, and wherein said computing comprises computing $\tilde{P}_t$ according to $\tilde{P}_t = CF_t$ or $\tilde{P}_t = \tilde{P}_{t-1} F_t / F_{t-1}$, and wherein $$F_t = \frac{RY_{t+1}}{(1 + \pi_{t+1})} \times \frac{\theta_t + (1 - \theta_t) \times \tilde{s}_t / \tilde{s}_{t+1}^e}{\theta_t + (1 - \theta_t) \times 1 / \tilde{s}_t}.$$

12. The method of claim 11, wherein the precious metal is gold.

13. The method of claim 7, wherein an asset of the at least one asset is the currency of the first economy.

14. The method of claim 13, wherein the first asset characteristic of the asset is $s_{t+1}^e$, wherein $s_{t+1}^e$ is an expected spot exchange rate at time t+1 such that one spot unit of a currency of a second economy equals $s_{t+1}^e$ spot units of the currency of the first economy, wherein the asset data comprises $s_t$, wherein $s_t$ is a spot exchange rate at time t such that one spot unit of the currency of the second economy equals $s_t$ spot units of the currency of the first economy, wherein $g_{y2}$ is defined as a GDP per capita growth rate for the second economy, wherein $\pi_{t+1,2}$ is defined as an expected inflation rate from time t to time t+1 for the second economy, wherein $RY_{t+1}$ is defined such that $RY_{t+1} = g_{y1} + \pi_{t+1,1}$, wherein $RY_{Xt+1}$ is defined such that $RY_{Xt+1} = g_{y2} + \pi_{t+1,2}$, and wherein said computing comprises computing $s_{t+1}^e$ according to $$\frac{s_{t+1}^e}{s_t} = \frac{RY_{t+1}}{RY_{Xt+1}}.$$

15. The method of claim 7, wherein the at least one asset characteristic of the asset comprises a second asset characteristic that is a measure of the volatility of the first asset characteristic of the asset.

16. The method of claim 3, wherein the method further comprises:
predicting a change in the at least one asset characteristic from the computed at least one asset characteristic;
evaluating at least one effect resulting from the change;
determining that said evaluating indicates an unacceptable risk to the portfolio; and
hedging the portfolio to mitigate the unacceptable risk.

17. The method of claim 3, wherein the method further comprises:
performing a technical and/or sentiment analysis for an asset of the at least one asset, including determining that a bullish market move is predicted for the asset or that a bearish market move is predicted for the asset; and
ascertaining that the asset is overvalued or that the asset is undervalued.

18. The method of claim 17, said method further comprising:
suggesting buying more of the asset for the portfolio if said determining has determined that the bullish market move is predicted for the asset and if said ascertaining has ascertained that the asset is undervalued; and
suggesting selling the asset from the portfolio if said determining has determined that the bearish market move is predicted for the asset and if said ascertaining has ascertained that the asset is overvalued.

19. The method of claim 1, wherein said executing comprises said processor running the analytic module and/or construction module, said running the analytic module comprising assessing the portfolio with respect to valuation impact under various actual, historic, expected, real-time, or hypothetical scenarios that may affect a Required Yield of the one or more assets, said results generated from running the construction module including a series of asset class mixes consistent with return goals, economic expectations, and risk assumptions for the portfolio, said economic expectations including an expectation of a target return for the portfolio, and wherein the method further comprises:
said processor running a recommendation module comprising utilizing the results from running the analytic module and/or construction module to suggest at least one asset change in the portfolio consistent with the asset class mixes; and
responsive to the suggested at least one asset change in conjunction with investor industry, return, and/or hedge preferences: rebalancing the at least one asset in the portfolio.

20. The method of claim 19, wherein the at least one asset change comprises asset sales and/or asset purchases in proportions consistent with the results from running the analytic module and/or construction module and in accordance with provided objectives or scenarios for the portfolio.

21. A computer program product, comprising a computer readable storage medium storing computer executable program code which, when executed by a processor of a computer system, causes the processor to implement a method for performing an asset analysis, said method comprising:

computing at least one asset characteristic of each asset of at least one asset, each asset characteristic of said at least one asset characteristic of each asset being computed as a function of a gross domestic product (GDP) per capita growth rate ($g_{y1}$) for a first economy, said GDP per capita growth rate for the first economy being comprised by economic data, wherein the at least one asset is selected from the group consisting of at least one bond, at least one real estate asset, at least one precious metal, a currency of the first economy, and combinations thereof;

transferring said computed at least one asset characteristic of each asset to a tangible medium selected from the group consisting of an information viewing medium, a printing device, a data storage medium, and combinations thereof; and executing at least one functional operation that utilizes one or more computed asset characteristics of the computed at least one asset characteristic of one or more assets of the at least one asset, wherein said executing at least one functional operation is selected from the group consisting of performing asset valuation, performing asset management, performing trading, performing portfolio management, performing portfolio analysis, performing portfolio construction, performing asset allocation, performing risk assessment and/or management, making a recommendation for investment and/or trading, managing a client account, performing hedging, running an analytic module comprising assessing a portfolio having the at least one asset therein, running a construction module comprising performing at least one risk and/or economic scenario and generating results therefrom, and combinations thereof.

22. The computer program product of claim 21, wherein the first economy is selected from the group consisting of an economy of a country, a global economy, and an economic unit that comprises a plurality of countries.

23. The computer program product of claim 21, wherein the economic data further comprises an expected inflation rate ($\pi_{t+1,1}$) for the first economy from time t to time t+1, each asset characteristic of said at least one asset characteristic of each asset being computed as a function of both the GDP per capita growth rate for the first economy and the expected inflation rate for the first economy in the economic data.

24. The computer program product of claim 23, wherein the at least one asset characteristic of an asset of the at least one asset comprises a first asset characteristic that is not a function of asset data relating to the asset, and wherein the asset of the at least one asset is a bond of the at least one bond.

25. The computer program product of claim 24, wherein the first asset characteristic of the asset is an expected Required Yield ($RY_{t+1}$) from time t to time t+1, and wherein said computing comprises computing $RY_{t+1}$ according to $RY_{t+1}=g_{y1}+\pi_{t+1,1}$.

26. The computer program product of claim 24, wherein the first asset characteristic of the asset is an expected nominal yield to maturity ($R_{bt+1}$) of the bond at time t+1, wherein said computing comprises computing $R_{bt+1}$ according to $R_{bt+1}=(g_{y1}+\pi_{t+1,1})/(1-\tau_{bt+1})$, and wherein $\tau_{bt+1}$ is an expected marginal tax rate on interest income or blended tax rate of interest and capital gains from time t to time t+1.

27. The computer program product of claim 23, wherein the at least one asset characteristic of an asset of the at least one asset comprises a first asset characteristic that is a function of asset data relating to the asset, said asset data having been accessed prior to said computing.

28. The computer program product of claim 27, wherein an asset of the at least one asset is a real estate asset of the at least one real estate asset.

29. The computer program product of claim 28, wherein the first asset characteristic of the asset is an expected market price per share ($P_t$) of the asset in the first economy at time t, wherein the asset data comprises $E(e_{t+1})$ and $b_{t+1}$, wherein $E(e_{t+1})$ is an expected earnings per share of the asset from time t to time t+1, wherein $b_{t+1}$ is an expected payout ratio of the asset at time t+1, wherein the economic data further comprises $\tau_{pt+1}$, $\tau_{ct+1}$, and $\tau_{it+1}$, wherein $\tau_{pt+1}$ is an expected average marginal tax rate for property income from time t to time t+1, wherein $\tau_{ct+1}$ is an expected top marginal capital gains tax rate from time t to time t+1, wherein $\tau_{it+1}$ is an expected average marginal tax rate for interest income from time t to time t+1, and wherein said computing comprises computing $P_t$ according to $$P_t = E(e_{t+1}) \times \frac{1 - \tau_{pt+1}b_{t+1} - \tau_{ct+1}(1 - b_{t+1})}{\text{Max}(g_y + \pi_{t+1}; (1 - \tau_{it+1})R_{bt+1})}.$$

30. The computer program product of claim 27, wherein an asset of the at least one asset is a precious metal of the at least one precious metal.

31. The computer program product of claim 30, wherein a foreign economy is a global economy of the whole world exclusive of the first economy, wherein the first asset characteristic of the asset is an expected real market price per share ($\tilde{P}_t$) of the asset in the first economy at time t, wherein the asset data comprises $\tilde{s}_t$ and $\tilde{s}_{t+1}^e$, wherein $\tilde{s}_t$ is a real currency exchange rate at time t such that one real unit of currency of the foreign economy equals $\tilde{s}_t$ real units of currency of the first economy, wherein $\tilde{s}_{t+1}^e$ is an expected real currency exchange rate at time t+1 such that one real unit of currency of the foreign economy equals $\tilde{s}_t$ real units of currency of the first economy, wherein $RY_{t+1}$ is defined such that $RY_{t+1}=g_{y1}+\pi_{t+1,1}$, wherein the economic data further comprises $\theta_t$, wherein $\theta_t$ is a relative nominal GDP weight of the first economy in the global economy, wherein C is a constant representing a real value of a perpetuity paying one ounce of gold every year forever under stable inflation and real long-term productivity, and wherein said computing comprises computing $\tilde{P}_t$ according to $\tilde{P}_t=CF_t$ or $\tilde{P}_t=\tilde{P}_{t-1}F_t/F_{t-1}$, and wherein $$F_t = \frac{RY_{t+1}}{(1+\pi_{t+1})} \times \frac{\theta_t + (1-\theta_t) \times \tilde{s}_t/\tilde{s}_{t+1}^e}{\theta_t + (1-\theta_t) \times 1/\tilde{s}_t}.$$

32. The computer program product of claim 31, wherein the precious metal is gold.

33. The computer program product of claim 27, wherein an asset of the at least one asset is the currency of the first economy.

34. The computer program product of claim 33, wherein the first asset characteristic of the asset is $s_{t+1}^e$, wherein $s_{t+1}^e$ is an expected spot exchange rate at time t+1 such that one spot unit of a currency of a second economy equals $s_{t+1}^e$ spot units of the currency of the first economy, wherein the asset data comprises $s_t$, wherein $s_t$ is a spot exchange rate at time t such that one spot unit of the currency of the second economy equals $s_t$ spot units of the currency of the first economy, wherein $g_{y2}$ is defined as a GDP per capita growth rate for the second economy, wherein $\pi_{t+1,2}$ is defined as an expected inflation rate from time t to time t+1 for the second economy, wherein $RY_{t+1}$ is defined such that $RY_{t+1}=g_{y1}+\pi_{t+1,1}$, wherein $RY_{Xt+1}$ is defined such that $RY_{Xt+1}=g_{y2}+\pi_{t+1,2}$, and wherein said computing comprises computing $s_{t+1}^e$ according to $$\frac{s_{t+1}^e}{s_t} = \frac{RY_{t+1}}{RY_{Xt+1}}.$$

35. The computer program product of claim 27, wherein the at least one asset characteristic of the asset comprises a second asset characteristic that is a measure of the volatility of the first asset characteristic of the asset.

36. The computer program product of claim 23, wherein the method further comprises:
    predicting a change in the at least one asset characteristic from the computed at least one asset characteristic;
    evaluating at least one effect resulting from the change;
    determining that said evaluating indicates an unacceptable risk to the portfolio; and
    hedging the portfolio to mitigate the unacceptable risk.

37. The computer program product of claim 23, wherein the method further comprises:
    performing a technical and/or sentiment analysis for an asset of the at least one asset, including determining that a bullish market move is predicted for the asset or that a bearish market move is predicted for the asset; and
    ascertaining that the asset is overvalued or that the asset is undervalued.

38. The computer program product of claim 37, said method further comprising:
    suggesting buying more of the asset for the portfolio if said determining has determined that the bullish market move is predicted for the asset and if said ascertaining has ascertained that the asset is undervalued; and
    suggesting selling the asset from the portfolio if said determining has determined that the bearish market move is predicted for the asset and if said ascertaining has ascertained that the asset is overvalued.

39. The computer program product of claim 21, wherein said executing comprises running the analytic module and/or construction module, said running the analytic module comprising assessing the portfolio with respect to valuation impact under various actual, historic, expected, real-time, or hypothetical scenarios that may affect a Required Yield of the one or more assets, said results generated from running the construction module including a series of asset class mixes consistent with return goals, economic expectations, and risk assumptions for the portfolio, said economic expectations including an expectation of a target return for the portfolio, and wherein the method further comprises:
    running a recommendation module comprising utilizing the results from running the analytic module and/or construction module to suggest at least one asset change in the portfolio consistent with the asset class mixes; and
    responsive to the suggested at least one asset change in conjunction with investor industry, return, and/or hedge preferences: rebalancing the at least one asset in the portfolio.

40. The computer program product of claim 39, wherein the at least one asset change comprises asset sales and/or asset purchases in proportions consistent with the results from running the analytic module and/or construction module and in accordance with provided objectives or scenarios for the portfolio.

41. A computer system comprising:
    a processor; and
    a computer readable memory unit coupled to the processor, said memory unit containing instructions that when executed by the processor implement a method for performing an asset analysis, said method comprising:
        computing at least one asset characteristic of each asset of at least one asset, each asset characteristic of said at least one asset characteristic of each asset being computed as a function of a gross domestic product (GDP) per capita growth rate ($g_{y1}$) for a first economy, said GDP per capita growth rate for the first economy being comprised by economic data, wherein the at least one asset is selected from the group consisting of at least one bond, at least one real estate asset, at least one precious metal, a currency of the first economy, and combinations thereof;
        transferring said computed at least one asset characteristic of each asset to a tangible medium selected from the group consisting of an information viewing medium, a printing device, a data storage medium, and combinations thereof; and
        executing at least one functional operation that utilizes one or more computed asset characteristics of the computed at least one asset characteristic of one or more assets of the at least one asset, wherein said executing at least one functional operation is selected from the group consisting of performing asset valuation, performing asset management, performing trading, performing portfolio management, performing portfolio analysis, performing portfolio construction, performing asset allocation, performing risk assessment and/or management, making a recommendation for investment and/or trading, managing a client account, performing hedging, running an analytic module comprising assessing a portfolio having the at least one asset therein, running a construction module comprising performing at least one risk and/or economic scenario and generating results therefrom, and combinations thereof.

42. The computer system of claim 41, wherein the first economy is selected from the group consisting of an economy of a country, a global economy, and an economic unit that comprises a plurality of countries.

43. The computer system of claim 41, wherein the economic data further comprises an expected inflation rate ($\pi_{t+1,1}$) for the first economy from time t to time t+1, each asset characteristic of said at least one asset characteristic of each asset being computed as a function of both the GDP per capita growth rate for the first economy and the expected inflation rate for the first economy in the economic data.

44. The computer system of claim 43, wherein the at least one asset characteristic of an asset of the at least one asset comprises a first asset characteristic that is not a function of asset data relating to the asset, and wherein the asset of the at least one asset is a bond of the at least one bond.

45. The computer system of claim 44, wherein the first asset characteristic of the asset is an expected Required Yield ($RY_{t+1}$) from time t to time t+1, and wherein said computing comprises computing $RY_{t+1}$ according to $RY_{t+1}=g_{y1}+\pi_{t+1,1}$.

46. The computer system of claim 44, wherein the first asset characteristic of the asset is an expected nominal yield to maturity ($R_{bt+1}$) of the bond at time t+1, wherein said computing comprises computing $R_{bt+1}$ according to $R_{bt+1}=(g_{y1}+\pi_{t+1,1})/(1-\tau_{bt+1})$, and wherein $\tau_{bt+1}$ is an expected marginal tax rate on interest income or blended tax rate of interest and capital gains from time t to time t+1.

47. The computer system of claim 43, wherein the at least one asset characteristic of an asset of the at least one asset comprises a first asset characteristic that is a function of asset data relating to the asset, said asset data having been accessed prior to said computing.

48. The computer system of claim 47, wherein an asset of the at least one asset is a real estate asset of the at least one real estate asset.

49. The computer system of claim 48, wherein the first asset characteristic of the asset is an expected market price per share ($P_t$) of the asset in the first economy at time t, wherein the asset data comprises $E(e_{t+1})$ and $b_{t+1}$, wherein $E(e_{t+1})$ is an expected earnings per share of the asset from time t to time t+1, wherein $b_{t+1}$ is an expected payout ratio of the asset at time t+1, wherein the economic data further comprises $\tau_{pt+1}$, $\tau_{ct+1}$, and $\tau_{it+1}$, wherein $\tau_{pt+1}$ is an expected average marginal tax rate for property income from time t to time t+1, wherein $\tau_{ct+1}$ is an expected top marginal capital gains tax rate from time t to time t+1, wherein $\tau_{it+1}$ is an expected average marginal tax rate for interest income from time t to time t+1, and wherein said computing comprises computing $P_t$ according to $$P_t = E(e_{t+1}) \times \frac{1 - \tau_{pt+1}b_{t+1} - \tau_{ct+1}(1 - b_{t+1})}{\text{Max}(g_y + \pi_{t+1}; (1 - \tau_{it+1})R_{bt+1})}.$$

50. The computer system of claim 47, wherein an asset of the at least one asset is a precious metal of the at least one precious metal.

51. The computer system of claim 50, wherein a foreign economy is a global economy of the whole world exclusive of the first economy, wherein the first asset characteristic of the asset is an expected real market price per share ($\tilde{P}_t$) of the asset in the first economy at time t, wherein the asset data comprises $\tilde{s}_t$ and $\tilde{s}_{t+1}^e$, wherein $\tilde{s}_t$ is a real currency exchange rate at time t such that one real unit of currency of the foreign economy equals $\tilde{s}_t$ real units of currency of the first economy, wherein $\tilde{s}_{t+1}^e$ is an expected real currency exchange rate at time t+1 such that one real unit of currency of the foreign economy equals $\tilde{s}_t$ real units of currency of the first economy, wherein $RY_{t+1}$ is defined such that $RY_{t+1}=g_{y1}+\pi_{t+1,1}$, wherein the economic data further comprises $\theta_t$, wherein $\theta_t$ is a relative nominal GDP weight of the first economy in the global economy, wherein C is a constant representing a real value of a perpetuity paying one ounce of gold every year forever under stable inflation and real long-term productivity, and wherein said computing comprises computing $\tilde{P}_t$ according to $\tilde{P}_t=CF_t$ or $\tilde{P}_t=\tilde{P}_{t-1}F_t/F_{t-1}$, and wherein $$F_t = \frac{RY_{t+1}}{(1 + \pi_{t+1})} \times \frac{\theta_t + (1 - \theta_t) \times \tilde{s}_t/\tilde{s}_{t+1}^e}{\theta_t + (1 - \theta_t) \times 1/\tilde{s}_t}.$$

52. The computer system of claim 51, wherein the precious metal is gold.

53. The computer system of claim 47, wherein an asset of the at least one asset is the currency of the first economy.

54. The computer system of claim 53, wherein the first asset characteristic of the asset is $s_{t+1}^e$, wherein $s_{t+1}^e$ is an expected spot exchange rate at time t+1 such that one spot unit of a currency of a second economy equals $s_{t+1}^e$ spot units of the currency of the first economy, wherein the asset data comprises $s_t$, wherein $s_t$ is a spot exchange rate at time t such that one spot unit of the currency of the second economy equals $s_t$ spot units of the currency of the first economy, wherein $g_{y2}$ is defined as a GDP per capita growth rate for the second economy, wherein $\pi_{t+1,2}$ is defined as an expected inflation rate from time t to time t+1 for the second economy, wherein $RY_{t+1}$ is defined such that $RY_{t+1}=g_{y1}+\pi_{t+1,1}$, wherein $RY_{Xt+1}$ is defined such that $RY_{Xt+1}=g_{y2}+\pi_{t+1,2}$, and wherein said computing comprises computing $s_{t+1}^e$ according to $$\frac{s_{t+1}^e}{s_t} = \frac{RY_{t+1}}{RY_{Xt+1}}.$$

55. The computer system of claim 47, wherein the at least one asset characteristic of the asset comprises a second asset characteristic that is a measure of the volatility of the first asset characteristic of the asset.

56. The computer system of claim 43, wherein the method further comprises:
predicting a change in the at least one asset characteristic from the computed at least one asset characteristic;
evaluating at least one effect resulting from the change;
determining that said evaluating indicates an unacceptable risk to the portfolio; and
hedging the portfolio to mitigate the unacceptable risk.

57. The computer system of claim 43, wherein the method further comprises:
performing a technical and/or sentiment analysis for an asset of the at least one asset, including determining that a bullish market move is predicted for the asset or that a bearish market move is predicted for the asset; and
ascertaining that the asset is overvalued or that the asset is undervalued.

58. The computer system of claim 57, said method further comprising:
suggesting buying more of the asset for the portfolio if said determining has determined that the bullish market move is predicted for the asset and if said ascertaining has ascertained that the asset is undervalued; and
suggesting selling the asset from the portfolio if said determining has determined that the bearish market move is predicted for the asset and if said ascertaining has ascertained that the asset is overvalued.

59. The computer system of claim 41, wherein said executing comprises running the analytic module and/or construction module, said running the analytic module comprising assessing the portfolio with respect to valuation impact under various actual, historic, expected, real-time, or hypothetical scenarios that may affect a Required Yield of the one or more assets, said results generated from running the construction module including a series of asset class mixes consistent with return goals, economic expectations, and risk assumptions for the portfolio, said economic expectations including an expectation of a target return for the portfolio, and wherein the method further comprises:
running a recommendation module comprising utilizing the results from running the analytic module and/or construction module to suggest at least one asset change in the portfolio consistent with the asset class mixes; and
responsive to the suggested at least one asset change in conjunction with investor industry, return, and/or hedge preferences: rebalancing the at least one asset in the portfolio.

60. The computer system of claim 59, wherein the at least one asset change comprises asset sales and/or asset purchases in proportions consistent with the results from running the analytic module and/or construction module and in accordance with provided objectives or scenarios for the portfolio.

* * * * *